United States Patent
Tsukahara

(10) Patent No.: US 10,682,548 B2
(45) Date of Patent: Jun. 16, 2020

(54) MOTION ANALYSIS DEVICE, MOTION ANALYSIS METHOD, PROGRAM, AND MOTION ANALYSIS SYSTEM

(71) Applicant: SEIKO EPSON CORPORATION, Tokyo (JP)

(72) Inventor: Kento Tsukahara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 88 days.

(21) Appl. No.: 15/865,584

(22) Filed: Jan. 9, 2018

(65) Prior Publication Data
US 2018/0207478 A1    Jul. 26, 2018

(30) Foreign Application Priority Data
Jan. 25, 2017 (JP) .................. 2017-011499

(51) Int. Cl.
| | | |
|---|---|---|
| G06K 9/00 | (2006.01) | |
| A63B 24/00 | (2006.01) | |
| A63B 69/36 | (2006.01) | |
| G06T 7/246 | (2017.01) | |
| G06T 11/00 | (2006.01) | |
| G09B 19/00 | (2006.01) | |

(52) U.S. Cl.
CPC ...... *A63B 24/0003* (2013.01); *A63B 69/3617* (2013.01); *A63B 69/3658* (2013.01); *G06T 7/246* (2017.01); *G06T 11/00* (2013.01); *G09B 19/0038* (2013.01); *A63B 2069/362* (2013.01)

(58) Field of Classification Search
CPC .......... A63B 2069/362; A63B 24/0003; A63B 69/3617; A63B 69/3658; G06T 11/00; G06T 7/246
See application file for complete search history.

(56) References Cited

U.S. PATENT DOCUMENTS

| | | | | |
|---|---|---|---|---|
| 2014/0106892 A1* | 4/2014 | Lin | .......................... | A61B 5/11 473/223 |
| 2015/0283427 A1* | 10/2015 | Shibuya | ............. | G09B 19/0038 700/91 |
| 2016/0175673 A1* | 6/2016 | Shibuya | ................... | A61B 5/11 473/223 |
| 2017/0095691 A1* | 4/2017 | Onuki | ................ | A63B 24/0003 |

FOREIGN PATENT DOCUMENTS

| | | |
|---|---|---|
| JP | 2002-286565 A | 10/2002 |
| JP | 2016-049231 A | 4/2016 |
| JP | 2017-070366 A | 4/2017 |

OTHER PUBLICATIONS

Google Scholar Search.*

* cited by examiner

*Primary Examiner* — Xin Jia
(74) *Attorney, Agent, or Firm* — Oliff PLC

(57) ABSTRACT

A motion analysis device analyzing a swing using an exercise apparatus, includes an acquisition section that acquires outputs from an inertial sensor, and a detection section that detects collision of the exercise apparatus with the ground by using at least an acceleration output among the outputs from the inertial sensor.

16 Claims, 15 Drawing Sheets

WORLD COORDINATE SYSTEM

SENSOR COORDINATE SYSTEM

FACE COORDINATE SYSTEM

FACE COORDINATE SYSTEM

MOTION ANALYSIS DEVICE, MOTION ANALYSIS METHOD, PROGRAM, AND MOTION ANALYSIS SYSTEM

CROSS-REFERENCE TO RELATED APPLICATION

This application claims priority of Japanese Patent Application No. 2017-011499, filed Jan. 25, 2017, which is expressly incorporated herein by reference thereto in its entirety.

BACKGROUND

1. Technical Field

The present invention relates to a motion analysis device, a motion analysis method, a program, and a motion analysis system.

2. Related Art

There is duff as one of the failures in a golf swing. Briefly, the "duff" indicates that a head of a golf club collides with the ground before impact. JP-A-2016-49231 discloses that a measured distance (a distance between an optical sensor and a ball) at impact is compared with a measured distance (a distance between the optical sensor and the ball) at an address position such that a direction and a position of the head are determined, and thus duff is determined.

However, in the technique disclosed in JP-A-2016-49231, since the determination is performed with an address position as a reference, in a case where the address position is not appropriate, there is concern that duff determination may fail. On the other hand, if slight duff in golf swing can be detected with high accuracy, or an amount of duff can be objectively measured, this helps a golfer in improving a swing, and thus the importance of duff determination may increase.

SUMMARY

An advantage of some aspects of the invention is to provide a technique in which a user can objectively understand collision of an exercise apparatus with the ground during a swing.

The invention can be implemented as the following forms or application examples.

APPLICATION EXAMPLE 1

A motion analysis device according to this application example analyzes a swing using an exercise apparatus, and includes an acquisition section that acquires outputs from an inertial sensor; and a detection section that detects collision of the exercise apparatus with the ground by using at least an acceleration output among the outputs from the inertial sensor.

There may be a difference in acceleration generated in the exercise apparatus between a swing accompanied by collision (so-called duff) with the ground and a swing not accompanied by collision. Thus, according to the application example in which detection is performed by using the acceleration output, a user can objectively understand whether or not collision with the ground occurs during a swing. A criterion of detection is appropriately set, and thus it is possible to prevent wrongly detecting simple contact with turfs or sands on the ground as collision with the ground. Conversely, collision with the ground, turfs, and sands may also be detected as collision. Here, the "exercise apparatus" is an exercise apparatus used to hit a ball, and is, for example, a golf club. The "ground" is a surface on which an object to be hit such as a ball is placed, and may be any of a ground on which plants such as turfs have grown, a ground on which soil or sands are placed, a ground paved with concrete, a floor of a building, a ground with a rubber mat, and a ground with artificial turfs. In a case where an object to be hit exposed from underwater or a water surface is hit, collision with a water surface may be regarded as "collision with the ground". Collision with an object not having the hardness of a predetermined level or higher may be excluded from "collision with the ground".

APPLICATION EXAMPLE 2

In the motion analysis device according to the application example, the acceleration output from the inertial sensor may include data regarding acceleration generated in a long axis direction of a shaft of the exercise apparatus.

Since a considerably great change occurs in an acceleration in the long axis direction in a case where collision has occurred and a case where collision has not occurred, if the acceleration output is used, it is possible to accurately detect whether or not collision with the ground has occurred.

APPLICATION EXAMPLE 3

In the motion analysis device according to the application example, the detection section may use an acceleration output and an angular velocity output from the inertial sensor for detection of the collision.

In a case where both of the acceleration output and the angular velocity output are used, it is possible to increase a possibility that the accuracy of detection can be increased or the reliability of detection can be estimated.

APPLICATION EXAMPLE 4

In the motion analysis device according to the application example, the detection section may calculate a collision amount of the exercise apparatus with the ground by using the outputs from the inertial sensor.

Therefore, the motion analysis device enables a user to objectively understand a collision amount in a case where collision with the ground has occurred. The "collision amount" mentioned here is a so-called duff amount, and includes at least one of a collision intensity, a collision time, and a collision distance.

APPLICATION EXAMPLE 5

In the motion analysis device according to the application example, the detection section may use an output value of the inertial sensor at a timing at which the collision is detected as a reference value, and may calculate the collision amount on the basis of an output value of the inertial sensor in a period from the timing to a timing at which an output value of the inertial sensor becomes the reference value again.

Therefore, the motion analysis device can calculate a collision amount on the basis of output values of the inertial sensor from the start of collision to the finish thereof.

Information calculated as the collision amount is at least one of, for example, a collision intensity, a collision time, and a collision distance.

APPLICATION EXAMPLE 6

In the motion analysis device according to the application example, the detection section may use, for calculation of the collision amount, a value obtained by dividing an output value of the inertial sensor by a speed of a ball hitting portion of the exercise apparatus.

Therefore, the motion analysis device of the application example can accurately calculate a collision amount regardless of the magnitude of a speed of the ball hitting portion. The same effect can be achieved by adjusting a reference of detection according to the speed instead of dividing an output value by the speed of the ball hitting portion.

APPLICATION EXAMPLE 7

In the motion analysis device according to the application example, the detection section may calculate the collision amount with the ground on the basis of a known relationship established between outputs from the inertial sensor and a collision amount of the exercise apparatus with the ground.

Therefore, the motion analysis device of the application example can accurately calculate a collision amount on the basis of the known relationship (a table or a computation formula obtained on the basis of statistical data). It is possible to reduce a calculation load required for calculation on the basis of the known relationship.

APPLICATION EXAMPLE 8

In the motion analysis device according to the application example, the detection section may further detect a timing at which the exercise apparatus collides with an object to be hit by using the outputs from the inertial sensor.

Therefore, the motion analysis device enables a user to easily compare a timing of collision with the ground with a timing of collision with an object to be hit. Measured data which is considerably deviated from the timing of collision with the object to be hit can be excluded as data having no relation to collision with the ground. In other words, if a timing of collision with an object to be hit is known, measured data related to collision with the ground can be efficiently extracted. The object to be hit is, for example, a ball, and collision with the ball is referred to as "impact".

APPLICATION EXAMPLE 9

A motion analysis method according to this application example analyzes a swing using an exercise apparatus, and includes acquiring outputs from an inertial sensor; detecting collision of the exercise apparatus with the ground by using at least an acceleration output among the outputs from the inertial sensor; and outputting a result of the detection.

There may be a difference in acceleration generated in the exercise apparatus between a swing accompanied by collision (so-called duff) with the ground and a swing not accompanied by collision. Thus, according to the application example in which detection is performed by using the acceleration output, a user can objectively understand whether or not collision with the ground occurs during a swing. A criterion of detection is appropriately set, and thus it is possible to prevent wrongly detecting simple contact with turfs or sands on the ground as collision with the ground. Conversely, collision with the ground, turfs, and sands may also be detected as collision. Here, the "exercise apparatus" is an exercise apparatus used to hit a ball, and is, for example, a golf club. The "ground" is a surface on which an object to be hit such as a ball is placed, and may be any of a ground on which plants such as turfs have grown, a ground on which soil or sands are placed, a ground paved with concrete, a floor of a building, a ground with a rubber mat, and a ground with artificial turfs. In a case where an object to be hit exposed from underwater or a water surface is hit, collision with a water surface may be regarded as "collision with the ground". Collision with an object not having the hardness of a predetermined level or higher may be excluded from "collision with the ground".

APPLICATION EXAMPLE 10

A program according to this application example is a program for analyzing a swing using an exercise apparatus and causing a computer to execute acquiring outputs from an inertial sensor; and detecting collision of the exercise apparatus with the ground by using at least an acceleration output among the outputs from the inertial sensor.

There may be a difference in acceleration generated in the exercise apparatus between a swing accompanied by collision (so-called duff) with the ground and a swing not accompanied by collision. Thus, according to the application example in which detection is performed by using the acceleration output, a user can objectively understand whether or not collision with the ground occurs during a swing. A criterion of detection is appropriately set, and thus it is possible to prevent wrongly detecting simple contact with turfs or sands on the ground as collision with the ground. Conversely, collision with the ground, turfs, and sands may also be detected as collision. Here, the "exercise apparatus" is an exercise apparatus used to hit a ball, and is, for example, a golf club. The "ground" is a surface on which an object to be hit such as a ball is placed, and may be any of a ground on which plants such as turfs have grown, a ground on which soil or sands are placed, a ground paved with concrete, a floor of a building, a ground with a rubber mat, and a ground with artificial turfs. In a case where an object to be hit exposed from underwater or a water surface is hit, collision with a water surface may be regarded as "collision with the ground". Collision with an object not having the hardness of a predetermined level or higher may be excluded from "collision with the ground".

APPLICATION EXAMPLE 11

A motion analysis system according to this application example includes any one of the motion analysis devices described above; and an inertial sensor.

There may be a difference in acceleration generated in the exercise apparatus between a swing accompanied by collision (so-called duff) with the ground and a swing not accompanied by collision. Thus, according to the application example in which detection is performed by using the acceleration output, a user can objectively understand whether or not collision with the ground occurs during a swing. A criterion of detection is appropriately set, and thus it is possible to prevent wrongly detecting simple contact with turfs or sands on the ground as collision with the ground. Conversely, collision with the ground, turfs, and sands may also be detected as collision. Here, the "exercise apparatus" is an exercise apparatus used to hit a ball, and is, for example, a golf club. The "ground" is a surface on which an object to be hit such as a ball is placed, and may be any of a ground on which plants such as turfs have grown, a ground on which soil or sands are placed, a ground paved with concrete, a floor of a building, a ground with a rubber mat, and a ground with artificial turfs. In a case where an object to be hit exposed from underwater or a water surface is hit, collision with a water surface may be regarded as "collision with the ground". Collision with an object not having the hardness of a predetermined level or higher may be excluded from "collision with the ground".

APPLICATION EXAMPLE 12

A motion analysis device according to this application example analyzes a swing using an exercise apparatus, in which the apparatus acquires outputs from an inertial sensor; and detects collision of the exercise apparatus with the ground by using at least an acceleration output among the outputs from the inertial sensor.

There may be a difference in acceleration generated in the exercise apparatus between a swing accompanied by collision (so-called duff) with the ground and a swing not accompanied by collision. Thus, according to the application example in which detection is performed by using the acceleration output, a user can objectively understand whether or not collision with the ground occurs during a swing. A criterion of detection is appropriately set, and thus it is possible to prevent wrongly detecting simple contact with turfs or sands on the ground as collision with the ground. Conversely, collision with the ground, turfs, and sands may also be detected as collision. Here, the "exercise apparatus" is an exercise apparatus used to hit a ball, and is, for example, a golf club. The "ground" is a surface on which an object to be hit such as a ball is placed, and may be any of a ground on which plants such as turfs have grown, a ground on which soil or sands are placed, a ground paved with concrete, a floor of a building, a ground with a rubber mat, and a ground with artificial turfs. In a case where an object to be hit exposed from underwater or a water surface is hit, collision with a water surface may be regarded as "collision with the ground". Collision with an object not having the hardness of a predetermined level or higher may be excluded from "collision with the ground".

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the drawings. The embodiments described below are not intended to improperly limit the content of the invention disclosed in the appended claims. In addition, all constituent elements described below are not essential constituent elements of the invention. Hereinafter, a motion analysis system 1 analyzing a golf swing will be described an example.

1. EMBODIMENTS 1-1. Overview

Figure 1:
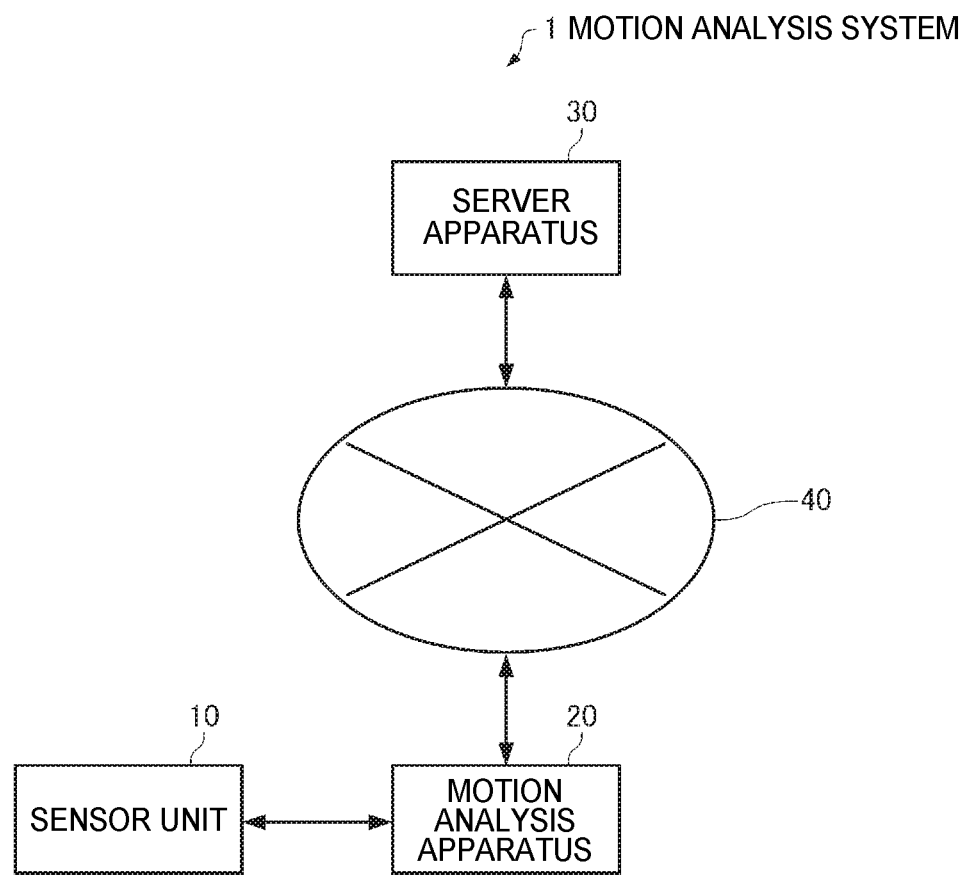
FIG. 1 is a diagram illustrating an overview of a motion analysis system.

As illustrated in FIG. 1, a motion analysis system 1 of the present embodiment is configured to include a sensor unit 10 (an example of an inertial sensor), a motion analysis device 20, and a server 30. The motion analysis device 20 and the server 30 can perform data communication with each other via a network 40 such as the Internet.

Figure 2:
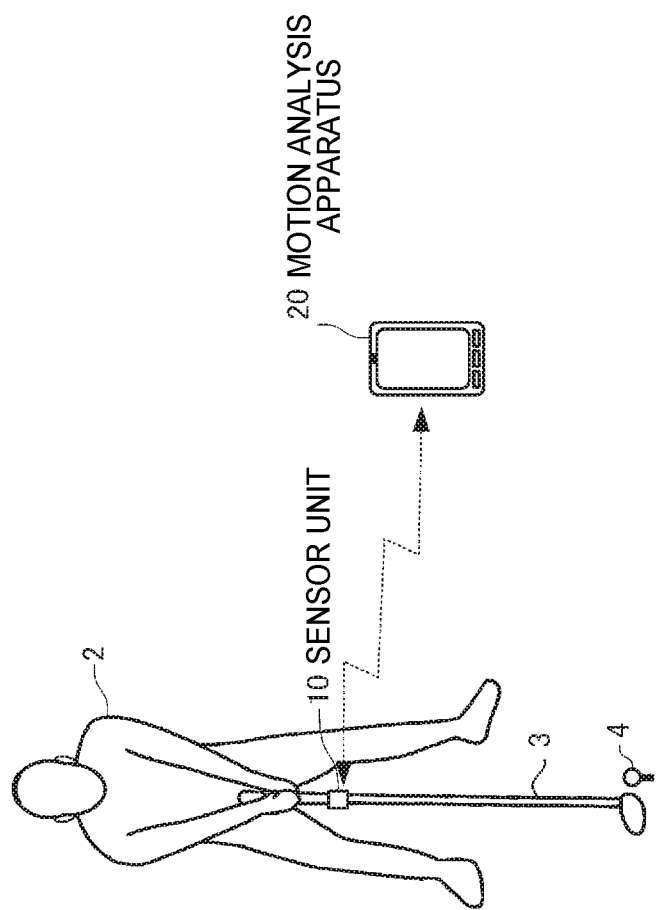
FIG. 2 is a diagram illustrating an example in which a sensor unit is attached.

The sensor unit 10 can measure acceleration generated in each axial direction of three axes and angular velocity generated around each of the three axes, and is attached to a golf club 3 (an example of an exercise apparatus) as illustrated in FIG. 2.

The sensor unit 10 which is an inertial sensor can measure acceleration generated in each axial direction of the three axes and angular velocity generated around each of the three axes. The sensor unit 10 is attached to apart of a shaft 3a of the golf club 3 so that one axis of three detection axes (an x axis, a y axis, and a z axis), for example, the y axis matches a long axis direction of the shaft 3a. Preferably, the sensor unit 10 is attached to a position close to a grip to which impact during a shot is hardly forwarded and a centrifugal force is not applied during a swing. The shaft 3a is a portion other than a head of the golf club 3 and also includes the grip.

A user 2 performs a swing action for hitting a golf ball 4 according to predefined procedures. For example, first, the user 2 holds the golf club 3, takes an address attitude so that a long axis of the shaft 3a of the golf club 3 is perpendicular to a target line (target hit ball direction), and stands still for a predetermined time or more (for example, one second or more). Next, the user 2 performs a swing action so as to hit and fly the golf ball 4. The address attitude in the present embodiment includes an attitude in a standing still state of the user 2 before starting a swing, or an attitude in a state in which the user 2 waggles an exercise apparatus before starting a swing.

While the user 2 performs an action of hitting the golf ball 4 according to the above-described procedures, the sensor unit 10 measures three-axis accelerations and three-axis angular velocities in a predetermined cycle (for example, 1 ms), and sequentially transmits the measured data to the motion analysis device 20. The sensor unit 10 may immediately transmit the measured data, and may store the measured data in an internal memory, and may transmit the measured data at a desired timing such as the time after a swing action of the user 2 is finished. Communication between the sensor unit 10 and the motion analysis device 20 may be wireless communication, and may be wired communication. Alternatively, the sensor unit 10 may store the measured data in a detachable recording medium such as a memory card, and the motion analysis device 20 may read the measured data from the recording medium.

The motion analysis device 20 analyzes a ball hitting position of the head of the golf club 3 in a horizontal direction (leftward-and-rightward direction) by using the data measured by the sensor unit 10. The motion analysis device 20 generates image data including information regarding the analyzed ball hitting position, and displays an image corresponding to the image data on a display section.

The motion analysis device 20 is, for example, a portable device such as a smart phone, a personal computer (PC), or a tablet PC. The motion analysis device 20 may be mounted on the waist of the user 2, and may be provided at a position which is visible from the user 2 performing a swing.

1-2. System Block Diagram

Figure 3:
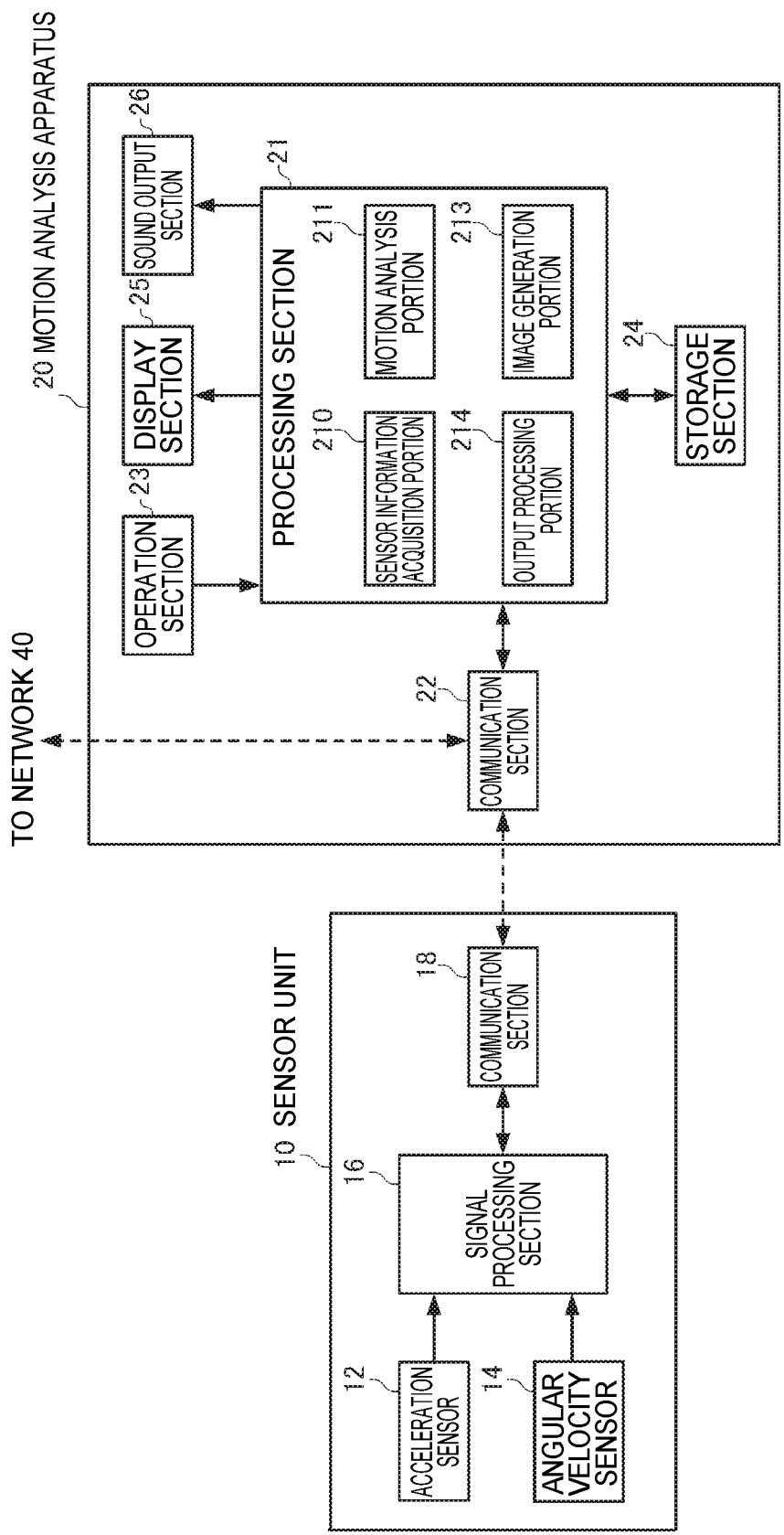
FIG. 3 is a block diagram illustrating configuration examples of the sensor unit and a motion analysis device.

FIG. 3 is a block diagram illustrating configuration examples of the sensor unit 10 and the motion analysis device 20.

The sensor unit 10 includes a processing section 11, a communication section 18, an acceleration sensor 12 (an example of an inertial sensor), and an angular velocity sensor 14 (an example of an inertial sensor).

The acceleration sensor 12 measures respective accelerations in three axial directions which intersect (ideally, orthogonal to) each other, and outputs digital signals (acceleration data) corresponding to magnitudes and directions of the measured three-axis accelerations.

The angular velocity sensor 14 measures respective angular velocities in three axial directions which intersect (ideally, orthogonal to) each other, and outputs digital signals (angular velocity data) corresponding to magnitudes and directions of the measured three-axis angular velocities.

The processing section 11 integrally controls the sensor unit 10. The processing section 11 receives the acceleration data and the angular velocity data from the acceleration sensor 12 and the angular velocity sensor 14, respectively, adds time information thereto, and stores the data in a storage portion (not illustrated). The processing section 11 adds time information to the stored measured data (the acceleration data and the angular velocity data) so as to generate packet data conforming to a communication format, and outputs the packet data to the communication section 18.

Ideally, the acceleration sensor 12 and the angular velocity sensor 14 are provided in the sensor unit 10 so that the three axes thereof match three axes (an x axis, a y axis, and a z axis) of an orthogonal coordinate system (sensor coordinate system) defined for the sensor unit 10, but, actually, errors occur in installation angles. Therefore, the processing section 11 performs a process of converting the acceleration data and the angular velocity data into data in the xyz coordinate system by using a correction parameter which is calculated in advance according to the installation angle errors.

The processing section 11 may perform a process of correcting the temperatures of the acceleration sensor 12 and the angular velocity sensor 14. Alternatively, the acceleration sensor 12 and the angular velocity sensor 14 may have a temperature correction function.

The acceleration sensor 12 and the angular velocity sensor 14 may output analog signals, and, in this case, the processing section 11 may A/D convert an output signal from the acceleration sensor 12 and an output signal from the angular velocity sensor 14 so as to generate measured data (acceleration data and angular velocity data), and may generate communication packet data by using the data.

The communication section 18 performs a process of transmitting packet data received from the processing section 11 to the motion analysis device 20, or a process of receiving a control command from the motion analysis device 20 and sending the control command to the processing section 11. The processing section 11 performs various processes corresponding to control commands.

The motion analysis device 20 includes a processing section 21, a communication section 22, an operation section 23, a storage section 24, a display section 25, and a sound output section 26.

The communication section 22 performs a process of receiving packet data transmitted from the sensor unit 10 and sending the packet data to the processing section 21, or a process of transmitting a control command from the processing section 21 to the sensor unit 10.

The operation section 23 performs a process of acquiring operation data from the user 2 and sending the operation data to the processing section 21. The operation section 23 may be, for example, a touch panel type display, a button, a key, or a microphone.

The storage section 24 is constituted of, for example, various IC memories such as a read only memory (ROM), a flash ROM, and a random access memory (RAM), or a recording medium such as a hard disk or a memory card.

The storage section 24 stores a program for the processing section 21 (an example of an acquisition section or a detection section) performing various calculation processes or a control process, or various programs or data for realizing application functions. The storage section 24 stores a motion analysis program which is read by the processing section 21 and executes a motion analysis process (an example of a motion analysis method). The motion analysis program may be stored in a nonvolatile recording medium (computer readable recording medium) in advance, or the motion analysis program may be received from the server 30 by the processing section 21 via the network 40, and may be stored in the storage section 24. The storage section 24 is used as a work area of the processing section 21, and temporarily stores data which is input from the operation section 23, results of calculation executed by the processing section 21 according to various programs, and the like. The storage section 24 may store data which is required to be preserved for a long period of time among data items generated through processing of the processing section 21.

The storage section 24 stores physical information of the user 2, club specification information indicating specifications of the golf club 3, and sensor attachment position information. For example, the user 2 may input physical information such as a height, a weight, and the sex thereof by operating the operation section 23, and the input physical information may be stored in the storage section 24 as the physical information. For example, the user 2 may input type numbers of the golf club 3 (alternatively, selects a type number from a type number list) by operating the operation section 23, so that specification information (for example, information such as a length of the shaft, a position of the centroid thereof, a lie angle, a face angle, a loft angle, and the like) for each type number is stored in the storage section 24 in advance. In this case, specification information of an input type number may be used as the golf club specification information. For example, the user 2 may input a distance between an attachment position of the sensor unit 10 and a grip end of the golf club 3 by operating the operation section 23, and the input distance information may be stored in the storage section 24 as the sensor attachment position information. Alternatively, the sensor unit 10 may be attached at a defined predetermined position (for example, a distance of 20 cm from the grip end), and thus information regarding the predetermined position may be stored as the sensor attachment position information in advance.

The display section 25 displays a processing result in the processing section 21 as text, a graph, a table, animation, and other images. The display section 25 may be, for example, a cathode ray tube (CRT) display, a liquid crystal display (LCD), an electrophoretic display (EPD), a display using an organic light emitting diode (OLED), a touch panel type display, and a head mounted display (HMD). A single touch panel type display may realize functions of the operation section 23 and the display section 25.

The sound output section 26 outputs a processing result in the processing section 21 as a sound such as a voice or a buzzer sound. The sound output section 26 may be, for example, a speaker or a buzzer.

The processing section 21 performs a process of transmitting a control command to the sensor unit 10, or various calculation processes on data which is received from the sensor unit 10 via the communication section 22, according to various programs. Particularly, in the present embodiment, by executing the motion analysis program, the processing section 21 functions as a sensor information acquisition portion 210 (an example of an acquisition section), a motion analysis portion 211 (an example of a detection section), a calculation portion 212, an image generation portion 213, and an output processing portion 214.

The processing section 21 may be realized by, for example, a computer including a central processing unit (CPU) which is a calculation device, a random access memory (RAM) which is a volatile storage device, a ROM which is a nonvolatile storage device, an interface (I/F) circuit connecting the processing section 21 to other units, and a bus connecting the above-described elements to each other. The computer may include various dedicated processing circuits such as an image processing circuit. The processing section 21 may be realized by an application specific integrated circuit (ASIC) or the like.

The sensor information acquisition portion 210 receives packet data which is received from the sensor unit by the communication section 22, and acquires time information and measured data from the received packet data (an example of an acquisition process). The acquired measured data includes angular velocity around the long axis of the shaft 3a of the golf club 3, generated due to the user 2's swing. The sensor information acquisition portion 210 stores the acquired time information and measured data in the storage section 24 in correlation with each other.

The motion analysis portion 211 performs a process of analyzing a swing motion of the user 2 using the measured data which is output from the sensor unit 10.

The image generation portion 213 performs a process of generating image data including information to be displayed on the display section 25.

The output processing portion 214 performs a process of displaying various images (including text, symbols, and the like in addition to an image corresponding to the image data generated by the image generation portion 213) on the display section 25. For example, the output processing portion 214 displays an image corresponding to image data generated by the image generation portion 213 on the display section 25 automatically or in response to an input operation performed by the user 2 after a swing motion of the user 2 is completed. Alternatively, a display section may be provided in the sensor unit 10, and the output processing portion 214 may transmit image data to the sensor unit 10 via the communication section 22, and various images may be displayed on the display section of the sensor unit 10.

The output processing portion 214 performs a process of outputting various sounds (including voices, buzzer sounds, and the like) from the sound output section 26. For example, the output processing portion 214 may read various pieces of information from the storage section 24, and may output a motion analysis sound or voice from the sound output section 26, automatically or in response to a predetermined input operation performed by the user 2 after a swing motion of the user 2 is completed. Alternatively, a sound output section may be provided in the sensor unit 10, and the output processing portion 214 may transmit various items of sound data or voice data to the sensor unit 10 via the communication section 22, and may output various sounds or voices from the sound output section of the sensor unit 10.

A vibration mechanism may be provided in the motion analysis device 20 or the sensor unit 10, and various pieces of information may be converted into pieces of vibration information by the vibration mechanism so as to be presented to the user 2.

1-3. World Coordinate System

Figure 4:
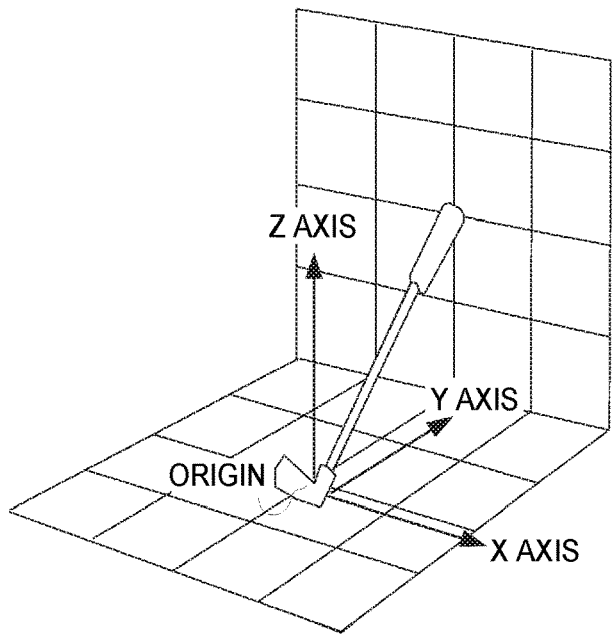
FIG. 4 is a diagram for explaining a world coordinate system.

The motion analysis portion 211 defines a world coordinate system fixed to the ground as illustrated in FIG. 4. The world coordinate system is used to express, for example, a trajectory of the golf club 3. As illustrated in FIG. 4, the origin of the world coordinate system is set at a position of a ball hitting portion (head) 3b when the user 2 takes an address attitude. A Z axis of the world coordinate system is set to an antigravitational direction (vertically upward), an X axis of the world coordinate system is set to a target hit ball direction (target line direction), and a Y axis of the world coordinate system is set to a direction which is orthogonal to an XZ plane. The world coordinate system illustrated in FIG. 4 is a right handed system.

1-4. Sensor Coordinate System

Figure 5:
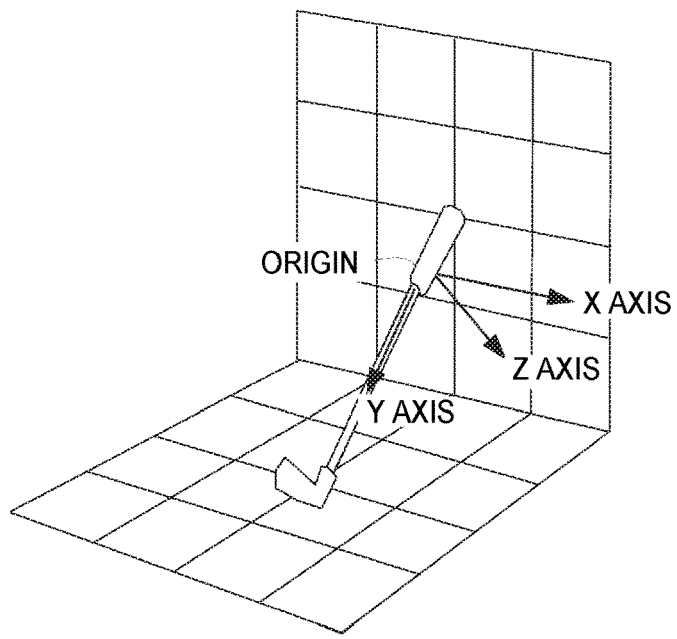
FIG. 5 is a diagram for explaining a sensor coordinate system.

The motion analysis portion 211 defines a sensor coordinate system fixed to the golf club 3 as illustrated in FIG. 5. The sensor coordinate system is used to express, for example, velocity, acceleration, and angular velocity of the golf club 3. As illustrated in FIG. 5, the origin of the sensor coordinate system is set at a position of the sensor unit 10. A z axis of the sensor coordinate system is set to the long axis direction of the shaft 3a, an x axis of the sensor coordinate system is set to a direction orthogonal to a ball hitting face (face surface) 3c, and a z axis of the sensor coordinate system is set to a direction orthogonal to an xy plane. A positive direction of the y axis is a direction from the grip to the ball hitting portion (head) 3b. The sensor coordinate system illustrated in FIG. 5 is a right handed system.

1-5. Face Coordinate System

Figure 6:
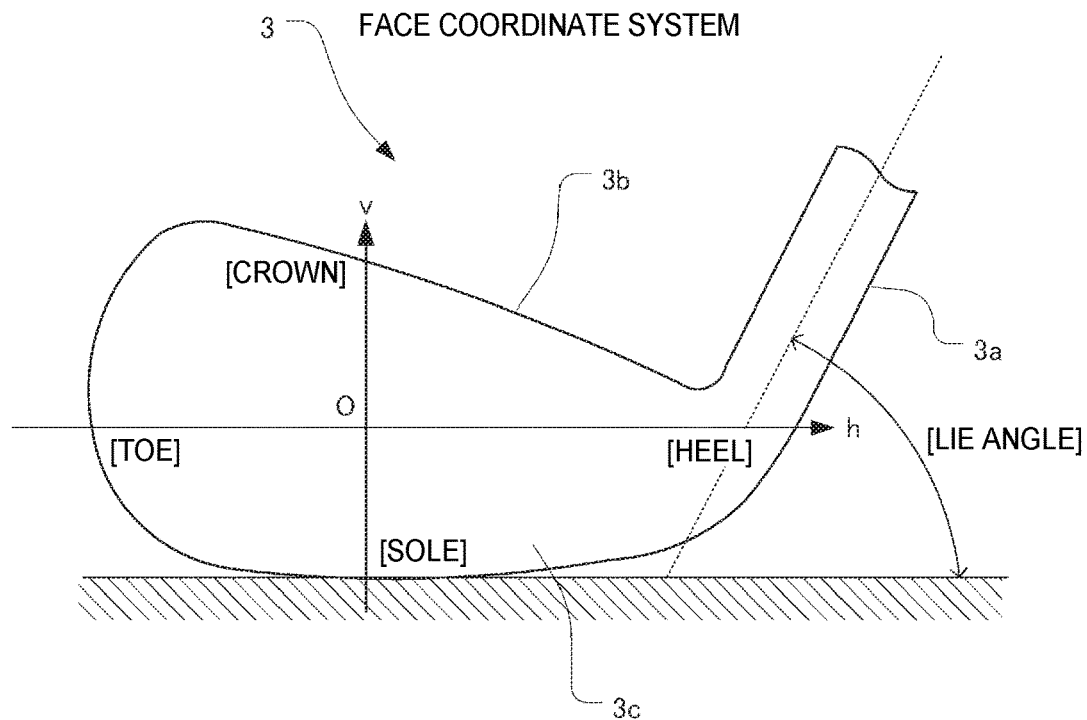
FIG. 6 is a diagram for explaining a head of a golf club.
Figure 7:
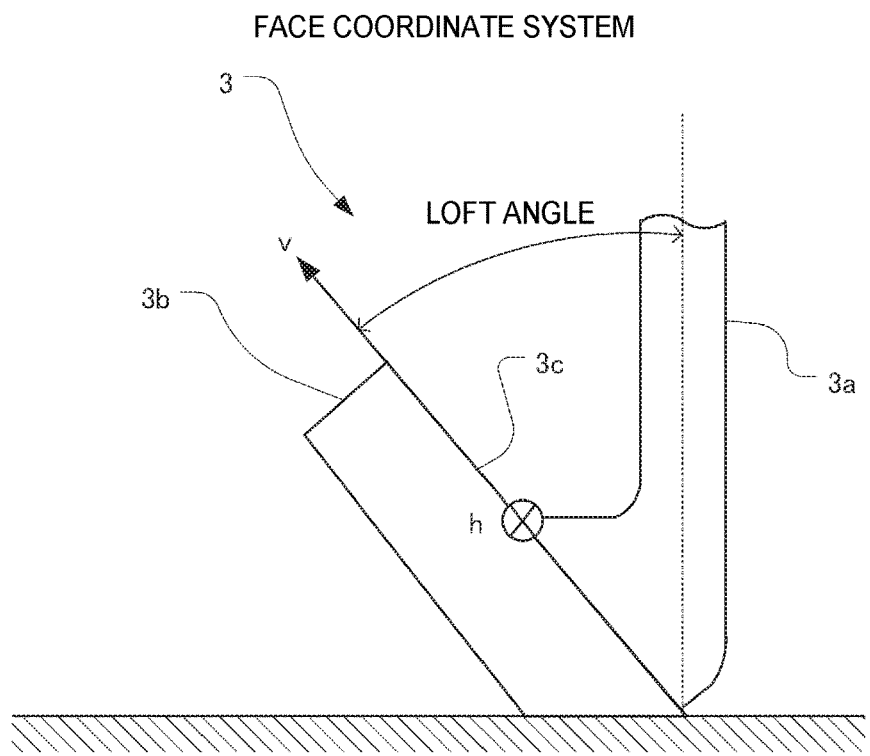
FIG. 7 is a diagram for explaining the head of the golf club.

The motion analysis portion 211 defines a face coordinate system as illustrated in FIGS. 6 and 7. The face coordinate system is used to express, for example, a ball hitting position on the ball hitting face (face surface) 3c of the ball hitting portion (head) 3b.

FIGS. 6 and 7 illustrate a part of the shaft 3a of the golf club 3 and the ball hitting portion (head) 3b of the golf club 3 at an address attitude. The ball hitting portion (head) 3b has the ball hitting face (face surface) 3c hitting a golf ball (an example of an object to be hit) 4. The golf club 3 is, for example, an iron club.

A portion of the ball hitting portion (head) 3b close to the shaft 3a is referred to as "heel", and a portion of the ball hitting portion (head) 3b separated from the shaft 3a is referred to as a "toe". A portion of the ball hitting portion (head) 3b close to the ground is referred to as a "sole", and a portion of the ball hitting portion (head) 3b separated from the ground is referred to as a "crown" at an address attitude.

For example, a direction of an h axis of the face coordinate system is set to a direction from the toe side toward the heel side, a direction of a v axis of the face coordinate system is set to a direction from the sole side toward the crown side, and the origin of the face coordinate system is set to a sweet spot (axis core).

The direction of the h axis of the face coordinate system may match the horizontal direction, and may be deviated relative to the horizontal direction. The direction of the v axis of the face coordinate system may match the gravitational direction, and may be deviated relative to the gravitational direction. The h axis and the v axis of the face coordinate system may not be orthogonal to each other. For example, the direction of the v axis of the face coordinate system may be set to the long axis direction (y axis direction) of the shaft 3a, and the direction of the h axis of the face coordinate system may be set to the horizontal direction. The origin of the face coordinate system may be set to a position corresponding to the center of the golf club 3, and may be set to a central position of the ball hitting face (face surface) 3c.

As appropriately, region of v>0 in the ball hitting face (face surface) 3c is referred to as a "crown side", a region of v<0 in the ball hitting face (face surface) 3c is referred to as a "sole side", a region of h>0 in the ball hitting face (face surface) 3c is referred to as "heel side", and a region of h<0 in the ball hitting face (face surface) 3c is referred to as a "toe side".

1-6. Lie Angle and Loft Angle

A shape of the ball hitting portion (head) 3b of the golf club 3 is defined depending on a specification of the golf club 3. A shape of the ball hitting portion (head) 3b may be substantially specified by a lie angle and a loft angle.

The lie angle of the golf club 3 is an angle formed between the ground and the central line of the shaft 3a in a case where the sole of the ball hitting portion (head) 3b comes into contact with the ground as indicated by a partial arc arrow in FIG. 6, and the loft angle of the golf club 3 is an angle formed between the central line of the shaft 3a of the ball hitting portion (head) 3b and the ball hitting face (face surface) 3c as indicated by a partial arc arrow in FIG. 7.

1-7. Fundamental Process in Motion Analysis Portion

First, the motion analysis portion 211 computes an offset amount included in measured data by using the measured data (acceleration data and angular velocity data) during standing still (at address) of the user 2, stored in the storage section 24. Next, the motion analysis portion 211 subtracts the offset amount from the measured data after starting the swing, stored in the storage section 24, so as to perform bias correction, and computes a position and an attitude of the sensor unit 10 during a swing action of the user 2 by using the bias-corrected measured data.

For example, the motion analysis portion 211 computes a position (initial position) of the sensor unit 10 during standing still (at address) of the user 2 in an XYZ coordinate system (a coordinate system in which a position of the ball hitting portion (head) 3b during standing still (at address) of the user 2 is set as the origin, a target hit ball direction is set as an X axis, an axis on a horizontal plane perpendicular to the X axis is set as a Y axis, and a vertically upward direction is set as a Z axis; hereinafter, referred to as a global coordinate system) by using the acceleration data measured by the acceleration sensor 12, the golf club specification information, and the sensor attachment position information, and integrates subsequent acceleration data and computes a positional change from the initial position of the sensor unit 10 in a time series. The user 2 stands still at a predetermined address attitude, and an X coordinate of the initial position of the sensor unit 10 is 0. Since the y axis of the sensor unit 10 matches the long axis direction of the shaft of the golf club 3, and the acceleration sensor 12 measures only the gravitational acceleration during standing still of the user 2, the motion analysis portion 211 may compute an inclined angle (an inclination relative to a horizontal plane (XY plane) or a vertical plane (XZ plane)) of the shaft by using y axis acceleration data. The motion analysis portion 211 may compute a Y coordinate and a Z coordinate of the initial position of the sensor unit 10 by using the inclined angle of the shaft, the club specification information (the length of the shaft), and the sensor attachment position information (a distance from the grip end), so as to specify the initial position of the sensor unit 10. Alternatively, the motion analysis portion 211 may compute coordinates of an initial position of the sensor unit 10 by using coordinates of a position of the grip end of the golf club 3 and the sensor attachment position information (a distance from the grip end).

The motion analysis portion 211 computes an attitude (initial attitude) of the sensor unit 10 during standing still (at address) of the user 2 in the XYZ coordinate system (global coordinate system) by using the acceleration data measured by the acceleration sensor 12, and computes changes in attitudes from the initial attitude of the sensor unit 10 by performing rotation calculation using angular velocity data which is subsequently measured by the angular velocity sensor 14. An attitude of the sensor unit 10 may be expressed by, for example, rotation angles (a roll angle, a pitch angle, and a yaw angle) around the X axis, the Y axis, and the Z axis, an Euler's angle, or a quaternion. Since the acceleration sensor 12 measures only the gravitational acceleration during standing still of the user 2, the motion analysis portion 211 may specify an angle formed between each of the x axis, the y axis, and the z axis of the sensor unit 10, and the gravitational direction by using three-axis acceleration data. Since the user 2 stands still at the predetermined address attitude, and thus the y axis of the sensor unit 10 is present on the YZ plane during standing still of the user 2, the motion analysis portion 211 can specify the initial attitude of the sensor unit 10.

The signal processing section of the sensor unit 10 may compute an offset amount of measured data so as to perform bias correction on the measured data, and the acceleration sensor 12 and the angular velocity sensor 14 may have a bias correction function. In this case, it is not necessary for the motion analysis portion 211 to perform bias correction on the measured data.

The motion analysis portion 211 defines a motion analysis model (double pendulum model) in which physical information (the height of the user 2 (the lengths of the arms)), club specification information (a length and a position of the centroid of the shaft), sensor attachment position information (a distance from the grip end), features (rigid body) of the golf club 3, or human features (a joint bending direction, and the like) are taken into consideration, and computes a trajectory of the golf club 3 in a swing of the user 2 by using the motion analysis model, and information regarding the position and the attitude of the sensor unit 10.

The motion analysis portion 211 detects a timing (impact timing) at which the user 2 hit the ball in a period of the swing action by using the time information and the measured data stored in the storage section 24. In the present embodiment, the motion analysis portion 211 computes a combined value of the measured data (the acceleration data or the angular velocity data) output from the sensor unit 10, and specifies the timing (time point) at which the user 2 hit the ball on the basis of the combined value.

The motion analysis portion 211 also generates a head speed from a backswing to follow-through, an incidence angle (club path) or a face angle during hitting of a ball, shaft rotation (a change amount of a face angle during a swing), and information such as a deceleration rate of the golf club 3, or information regarding a variation in these pieces of information in a case where the user 2 performs a plurality of swings, by using the motion analysis model and the information regarding the position and the attitude of the sensor unit 10.

The motion analysis portion 211 detects a series of actions (also referred to as a "rhythm") from the start of a swing to the finish of the swing, for example, the start of the swing, a backswing, a top, a downswing, impact, follow-through, and the finish of the swing, by using measured data acquired from the sensor unit 10. Specific procedures of detecting the rhythm are not particularly limited, but, for example, the following procedures may be employed.

First, the motion analysis portion 211 computes a sum (referred to as a norm) of magnitudes of angular velocities around each axis at respective time points t by using the angular velocity data at acquisition time points t. The motion analysis portion 211 may differentiate the norm of the angular velocities at the respective time point t with time.

Figure 8:
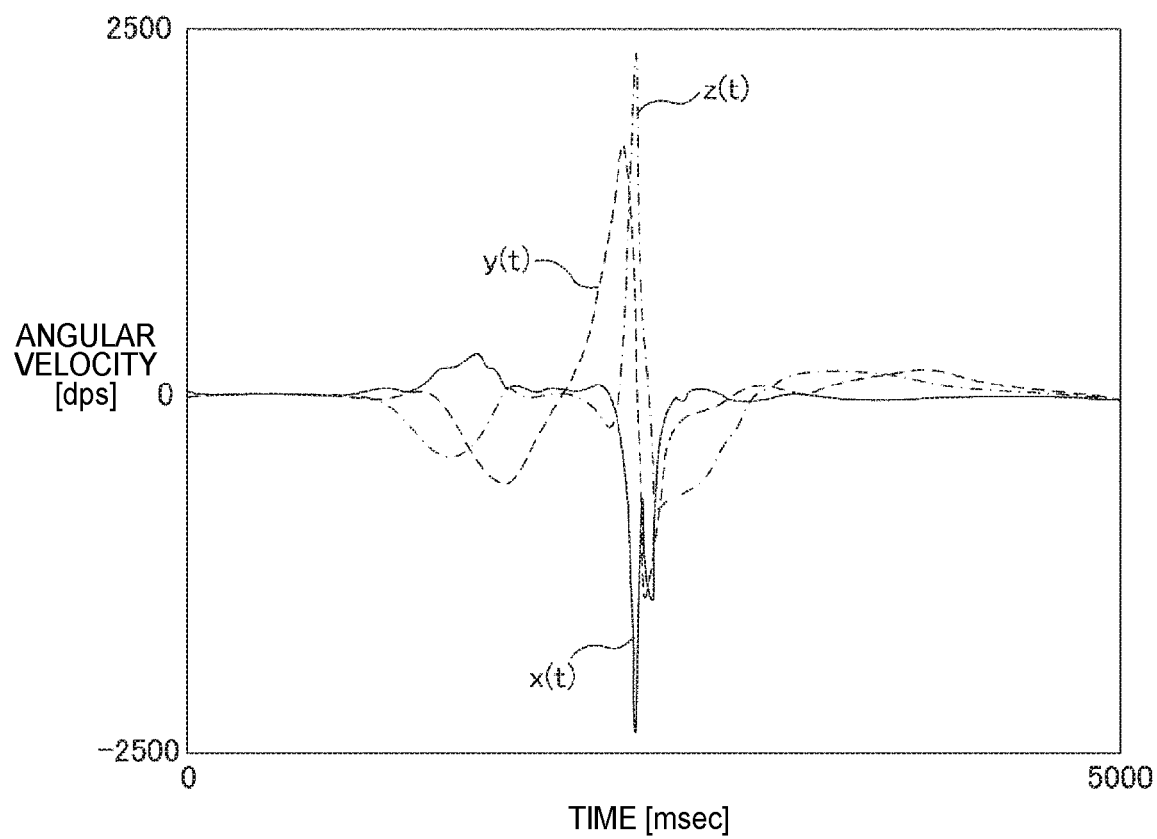
FIG. 8 is a diagram illustrating an example of angular velocity which is output from the sensor unit.
Figure 9:
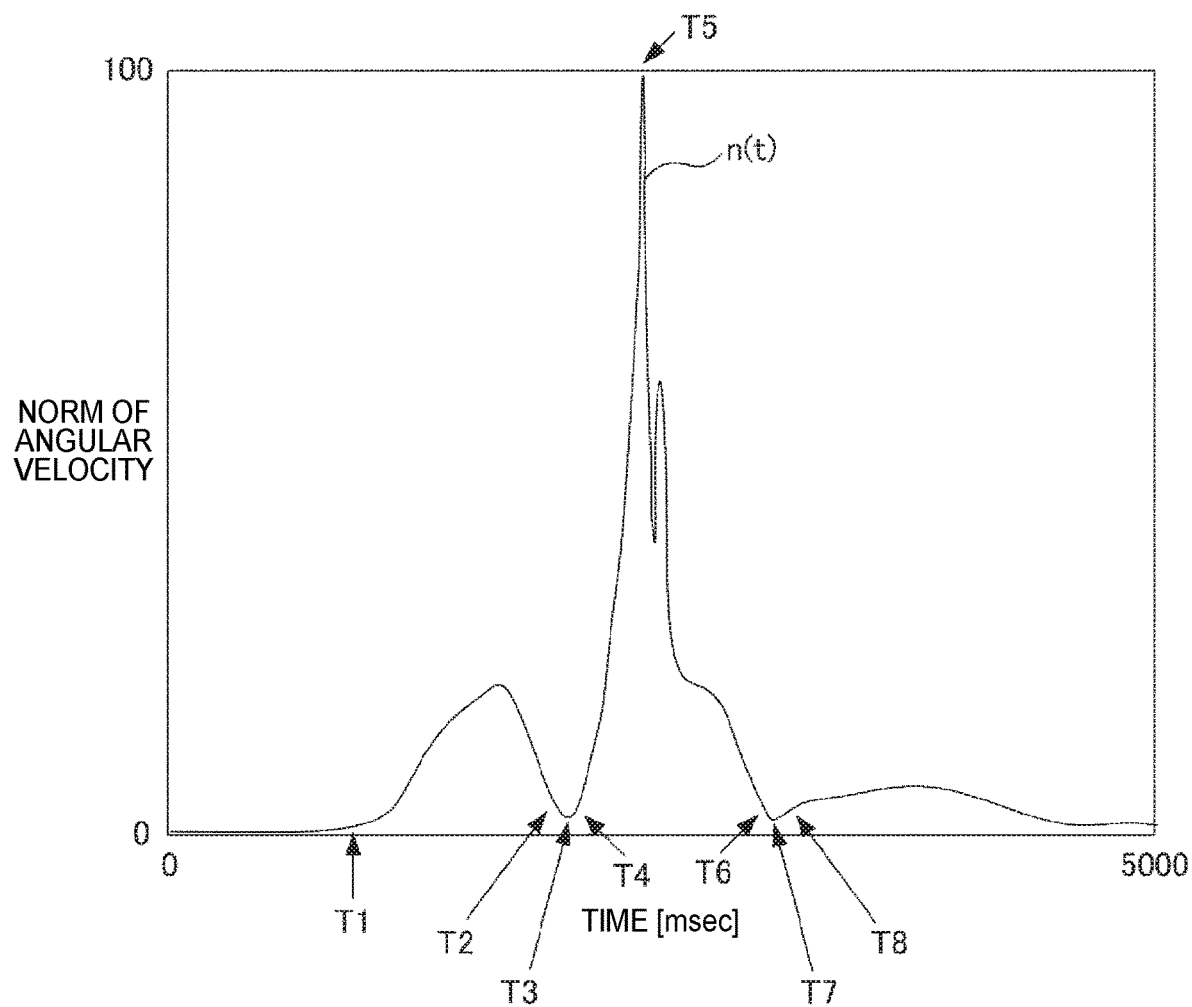
FIG. 9 is a diagram illustrating an example of a norm of angular velocities.
Figure 10:
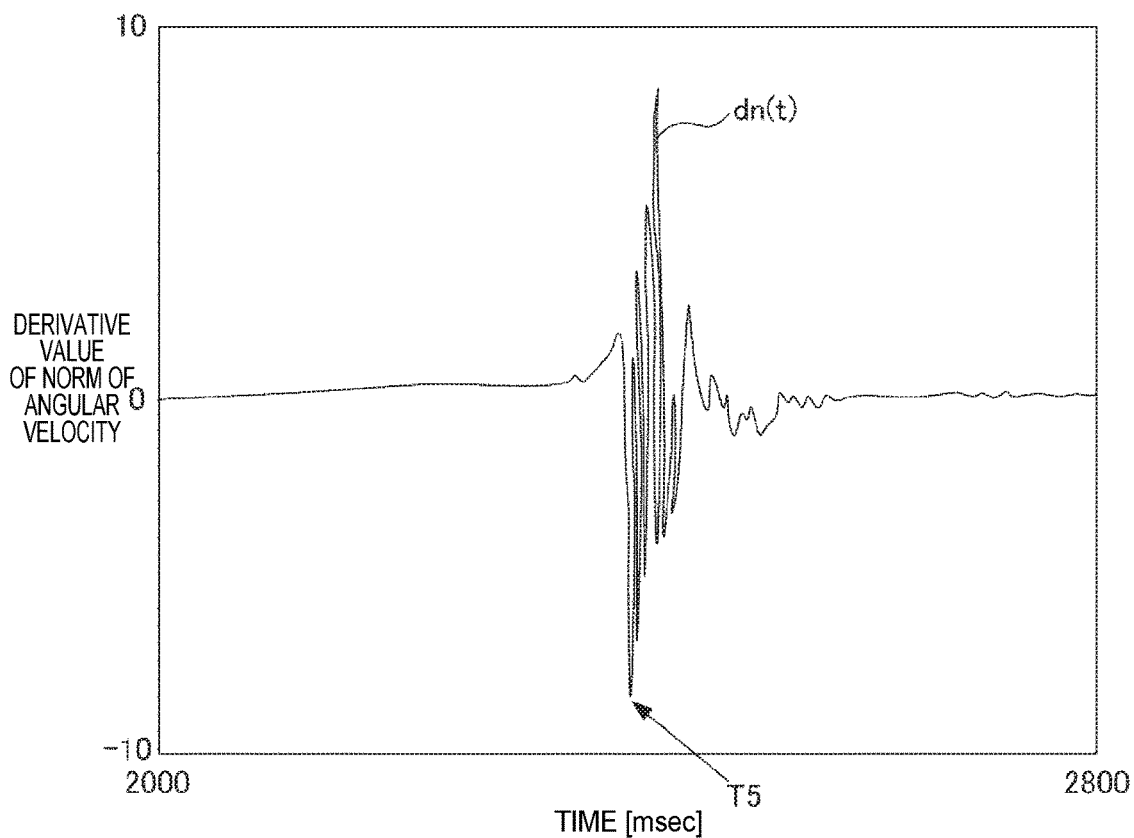
FIG. 10 is a diagram illustrating an example of a derivative value of the norm of the angular velocities.

Here, a case is assumed in which angular velocities around the three axes (the x axis, the y axis, and the z axis) are expressed, for example, in a graph illustrated in FIG. 8. In FIG. 8, a transverse axis expresses time (msec), and a longitudinal axis expresses angular velocity (dps). A norm of angular velocities is illustrated in a graph as illustrated in FIG. 9, for example. In FIG. 9, a transverse axis expresses time (msec), and a longitudinal axis expresses a norm of the angular velocities. A derivative value of the norm of the angular velocities is illustrated in a graph in FIG. 10, for example. In FIG. 10, a transverse axis expresses time (msec), and a longitudinal axis expresses a derivative value of the norm of the angular velocities. FIGS. 8 to 10 are drawings for better understanding of the present embodiment, and do not illustrate accurate values.

The motion analysis portion 211 detects an impact timing in the swing by using the computed norm of the angular velocities. The motion analysis portion 211 detects, for example, a timing at which the norm of the angular velocities is the maximum as the impact timing (reference sign T5). For example, of a timing at which a derivative value of the computed norm of the angular velocities is the maximum and a timing at which a derivative value thereof is minimum, the motion analysis portion 211 may detect the former timing as the impact timing (reference sign T5).

The motion analysis portion 211 detects, for example, a timing at which the computed norm of the angular velocities is the minimum before impact as a top timing in the swing (reference sign T3). The motion analysis portion 211 specifies a period in which the norm of the angular velocities which is equal to or less than a first threshold value continues as a top period (a staying period at the top) (reference signs T2 to T4).

The motion analysis portion 211 detects, for example, a timing at which the norm of the angular velocities is equal to or less than a second threshold value before the top as a swing start timing (reference sign T1).

The motion analysis portion 211 detects, for example, a timing at which the norm of the angular velocities is the minimum after the impact as a swing finish timing (reference sign T7). Alternatively, the motion analysis portion 211 may detect, for example, an initial timing at which the norm of the angular velocities is equal to or less than a third threshold value after the impact as the swing finish timing. The motion analysis portion 211 specifies, for example, a period in which the norm of the angular velocities which is equal to or less than a fourth threshold value continues after the impact timing and close to the impact timing as a finish period (reference signs T6 to T8).

In the above-described way, the motion analysis portion 211 may detect the rhythm of the swing. The motion analysis portion 211 may specify each period during a swing (for example, a backswing period from swing start to top start, a downswing period from top finish to impact, and a follow-through period from the impact to swing finish) by detecting the rhythm.

1-8. Method of Embodiment

As described above, the motion analysis device 20 of the present embodiment analyzes a swing using the golf club 3, and includes the processing section 21. The processing section 21 operates as an acquisition section acquiring outputs from the sensor unit 10 as appropriate, and operates as a detection section detecting collision (duff) of the golf club 3 with the ground by using at least an acceleration output among the outputs of the sensor unit 10.

There may be a difference in acceleration generated in the golf club 3 between a swing accompanied by duff and a swing not accompanied by duff. Thus, according to the present embodiment in which detection is performed by using the acceleration output, the user 2 can objectively understand whether or not duff occurs during a swing. A criterion of detection is appropriately set, and thus it is possible to prevent wrongly detecting simple contact with turfs or sands on the ground as duff. Conversely, collision with the ground, turfs, and sands may also be detected as duff. The "ground" is a surface on which the golf ball 4 is placed, and may be any of a ground on which plants such as turfs have grown, a ground on which soil or sands are placed, a ground paved with concrete, a floor of a building, a ground with a rubber mat, and a ground with artificial turfs. Collision with an object not having the hardness of a predetermined level or higher may be excluded from "duff".

1-8-1. Explanation of Sensor to be Used

As described above, in the motion analysis device 20 of the present embodiment, an acceleration output of the sensor unit 10 includes at least data regarding an acceleration generated in the long axis direction (the y axis direction in FIG. 5) of the shaft 3a of the golf club 3. Since a considerably great change occurs in an acceleration in the y axis direction in a case where duff has occurred and a case where duff has not occurred, if the acceleration output is used, it is possible to accurately detect whether or not duff has occurred.

In the motion analysis device 20 of the present embodiment, the processing section 21 as a detection section uses an acceleration output and an angular velocity output of the sensor unit 10 for detection of duff. In a case where both of the acceleration output and the angular velocity output are used, it is possible to increase a possibility that the accuracy of detection can be increased or the reliability of detection can be estimated.

In the present embodiment, in order that duff can be detected, each sampling rate in the acceleration sensor 12 and the angular velocity sensor 14 mounted on the sensor unit 10 is set to, for example, 2000 Hz.

As the acceleration sensor 12, a high G two-axis acceleration sensor is preferably mounted in addition to a typical three-axis acceleration sensor which is used for measurement or the like of a swing trajectory. The term "high G" of the high G two-axis acceleration sensor indicates that the sensor has a wide dynamic range in which acceleration which may be generated in the golf club 3 when duff occurs during a golf swing can be detected. This dynamic range is wider than a dynamic range of a typical acceleration sensor. The term "two-axis" of the high G two-axis acceleration sensor indicates the x axis and the y axis of the sensor coordinate system. The number of axes of the high G acceleration sensor is only an example, and is not limited thereto, and may be changed as appropriate according to required accuracy or the like.

As the angular velocity sensor 14, a high G three-axis angular velocity sensor is preferably mounted in addition to a typical three-axis angular velocity sensor which is used for measurement or the like of a swing trajectory. The term "high G" of the high G three-axis angular velocity sensor indicates that the sensor has a wide dynamic range in which angular velocity which may be generated in the golf club 3 when duff occurs during a golf swing can be detected. This dynamic range is wider than a dynamic range of a typical angular velocity sensor. The term "three-axis" of the high G three-axis angular velocity sensor indicates the x axis, the y axis, and the z axis of the sensor coordinate system. The number of axes of the high G angular velocity sensor is only an example, and is not limited thereto, and may be changed as appropriate according to required accuracy or the like.

1-8-2. Preparation

As described above, the user 2 attaches the sensor unit 10 to the vicinity of the grip of the golf club 3 in a predetermined posture (refer to FIG. 2), inputs various pieces of information regarding the golf club 3 or the like to the motion analysis device 20, and places the golf ball 4 on the ground (refer to FIG. 2).

The user 2 performs a swing with the golf club 3, and hits the golf ball 4. During a swing period, the angular velocity sensor 14 and the acceleration sensor 12 of the sensor unit 10 generate measured data at a predetermined sampling interval. During the swing period or after the swing period is finished, the sensor unit 10 transmits the measured data to the motion analysis device 20 in a predetermined format via the communication section 18. The motion analysis device 20 receives the measured data via the communication section 22, and stores the measured data in the storage section 24.

Here, it is assumed that the measured data includes at least two-axis acceleration data generated by the high G two-axis acceleration sensor and three-axis angular velocity data generated by the high G three-axis angular velocity sensor. Of the data, the acceleration data includes time-series data of an acceleration generated in the x axis direction and time-series data of an acceleration generated in the y axis direction. The angular velocity data includes time-series data of an angular velocity generated around the x axis, time-series data of an angular velocity generated around the y axis, and time-series data of an angular velocity generated around the z axis. FIGS. 11 to 15 are graphs related to measured data acquired in a first swing performed by the user 2, and FIGS. 16 to 20 are graphs related to measured data acquired in a second swing performed by the user 2. Herein, it is assumed that duff occurs in each of the first swing (FIGS. 11 to 15) and the second swing (FIGS. 16 to 20).

Figure 11:
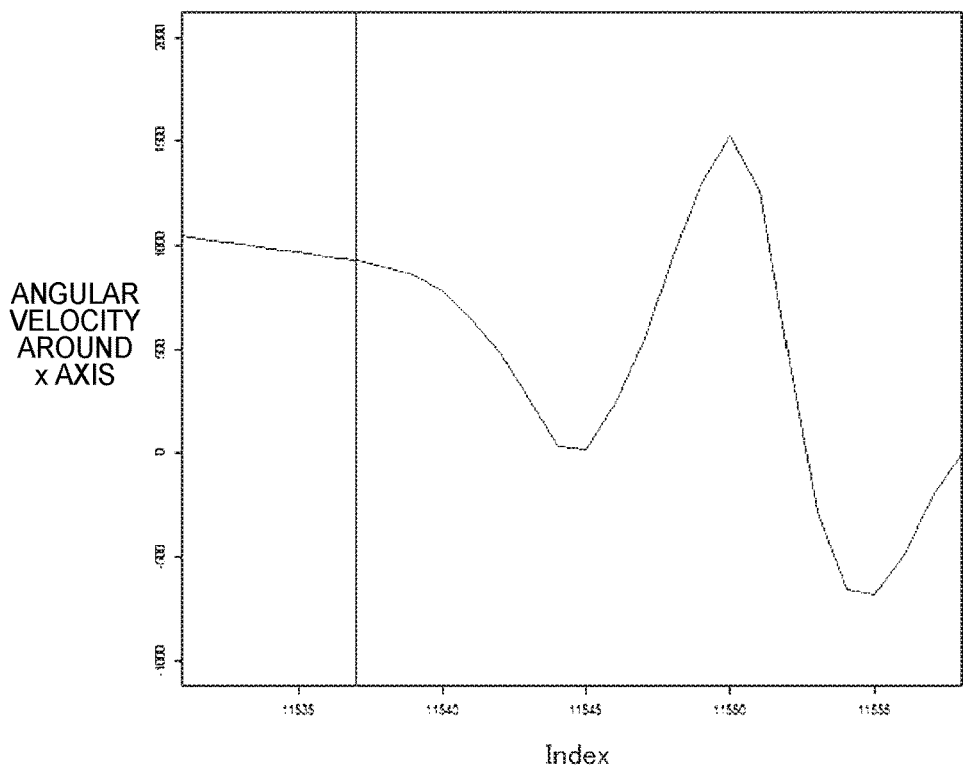
FIG. 11 is a graph illustrating a temporal change of angular velocity around an x axis before and after impact in a first swing.

FIG. 11 is a graph illustrating a temporal change of an angular velocity around the x axis before and after impact in the first swing. A longitudinal axis in FIG. 11 expresses an angular velocity around the x axis, and a transverse axis in FIG. 11 expresses a sampling number (Index) of items of data arranged in a time series. A single sampling number corresponds to a sampling interval [1/2000 Hz].

Figure 12:
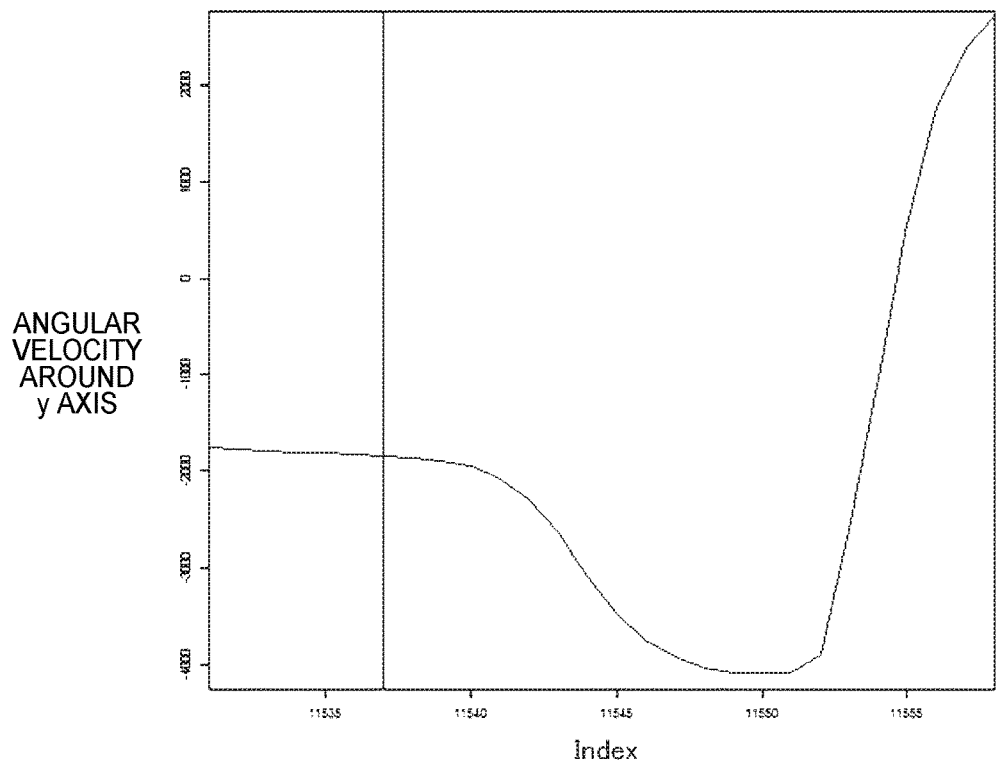
FIG. 12 is a graph illustrating a temporal change of angular velocity around a y axis before and after impact in the first swing.

FIG. 12 is a graph illustrating a temporal change of an angular velocity around the y axis before and after impact in the first swing. A longitudinal axis in FIG. 12 expresses an angular velocity around the y axis, and a transverse axis in FIG. 12 expresses a sampling number (Index) of items of data arranged in a time series. A single sampling number corresponds to a sampling interval [1/2000 Hz].

Figure 13:
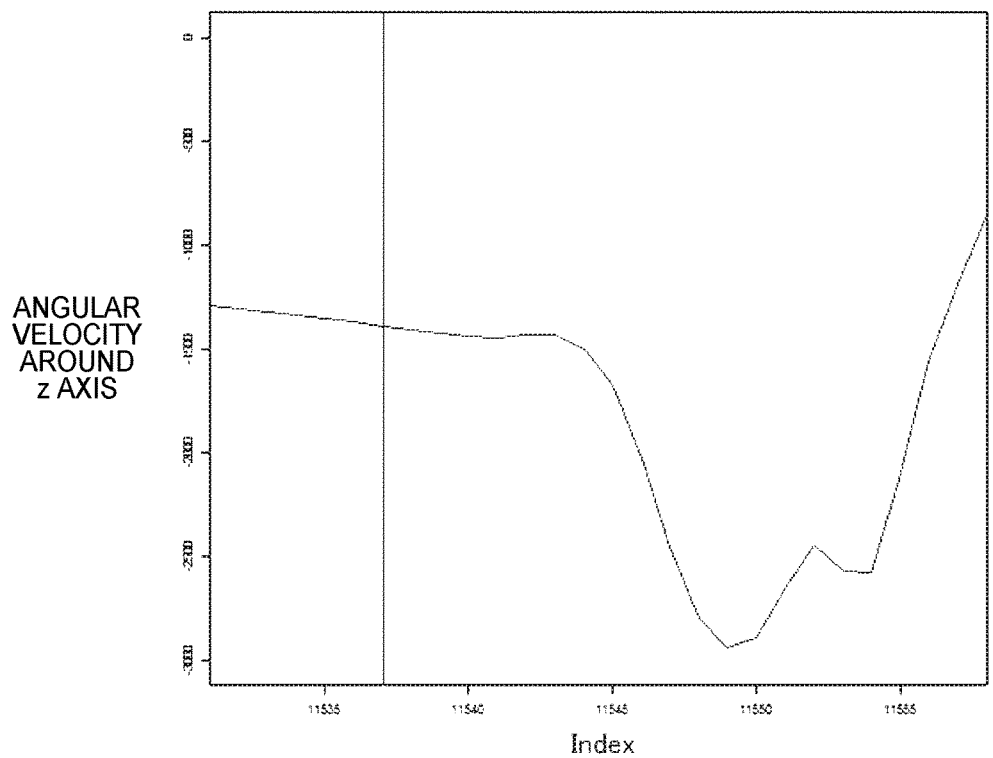
FIG. 13 is a graph illustrating a temporal change of angular velocity around a z axis before and after impact in the first swing.

FIG. 13 is a graph illustrating a temporal change of an angular velocity around the z axis before and after impact in the first swing. A longitudinal axis in FIG. 13 expresses an angular velocity around the z axis, and a transverse axis in FIG. 13 expresses a sampling number (Index) of items of data arranged in a time series. A single sampling number corresponds to a sampling interval [1/2000 Hz].

Figure 14:
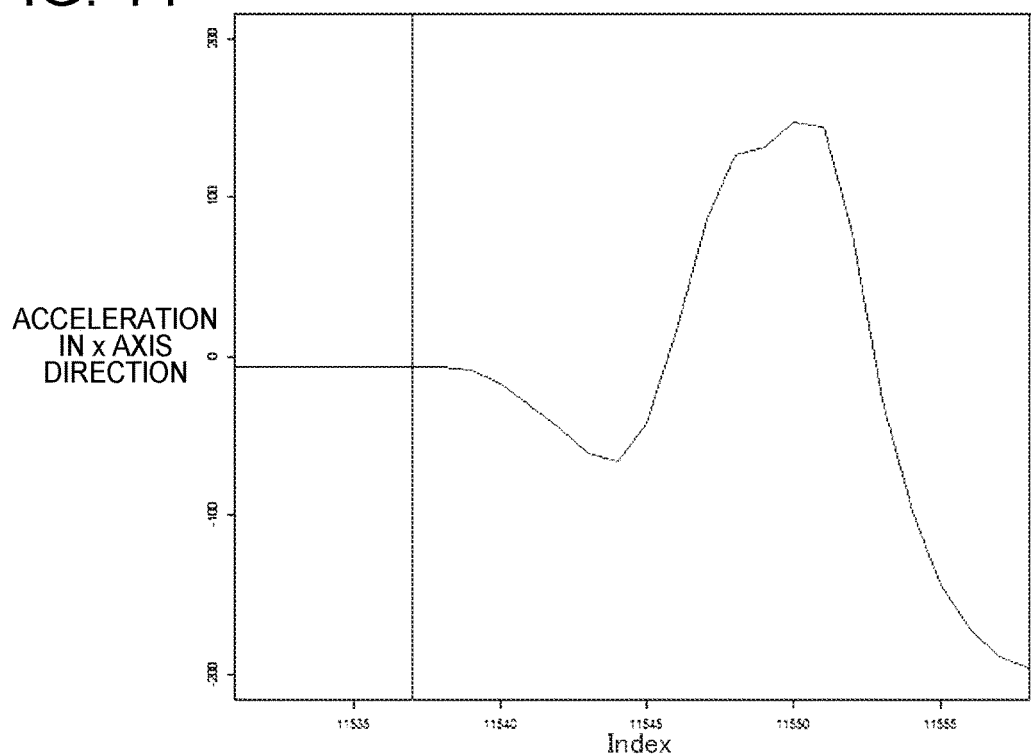
FIG. 14 is a graph illustrating a temporal change of acceleration in an x axis direction before and after impact in the first swing.

FIG. 14 is a graph illustrating a temporal change of an acceleration in the x axis direction before and after impact in the first swing. A longitudinal axis in FIG. 14 expresses an acceleration in the x axis direction, and a transverse axis in FIG. 14 expresses a sampling number (Index) of items of data arranged in a time series. A single sampling number corresponds to a sampling interval [1/2000 Hz].

Figure 15:
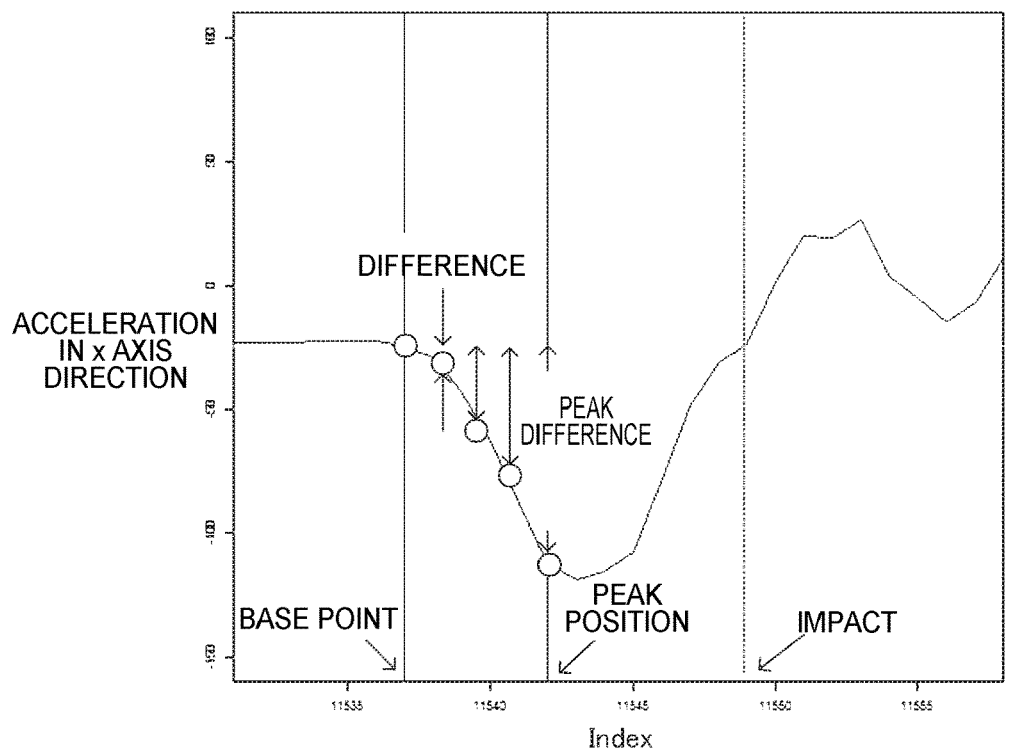
FIG. 15 is a graph illustrating a temporal change of acceleration in a y axis direction before and after impact in the first swing.

FIG. 15 is a graph illustrating a temporal change of an acceleration in the y axis direction before and after impact in the first swing. A longitudinal axis in FIG. 15 expresses an acceleration in the y axis direction, and a transverse axis in FIG. 15 expresses a sampling number (Index) of items of data arranged in a time series. A single sampling number corresponds to a sampling interval [1/2000 Hz].

Figure 16:
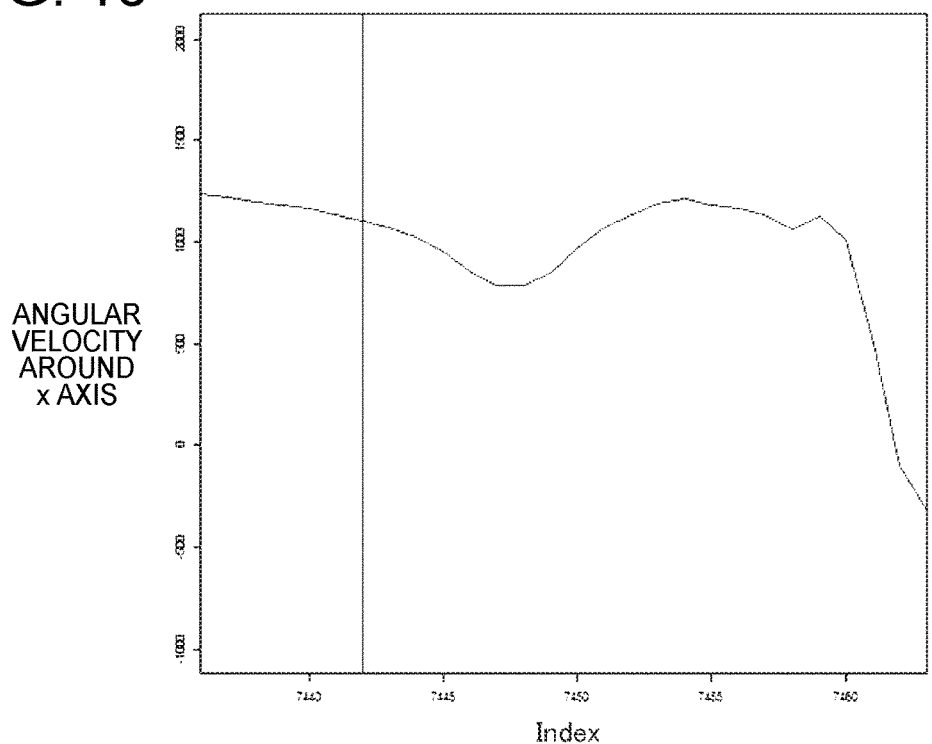
FIG. 16 is a graph illustrating a temporal change of angular velocity around an x axis before and after impact in a second swing.

FIG. 16 is a graph illustrating a temporal change of an angular velocity around the x axis before and after impact in the second swing. A longitudinal axis in FIG. 16 expresses an angular velocity around the x axis, and a transverse axis in FIG. 16 expresses a sampling number (Index) of items of data arranged in a time series. A single sampling number corresponds to a sampling interval [1/2000 Hz].

Figure 17:
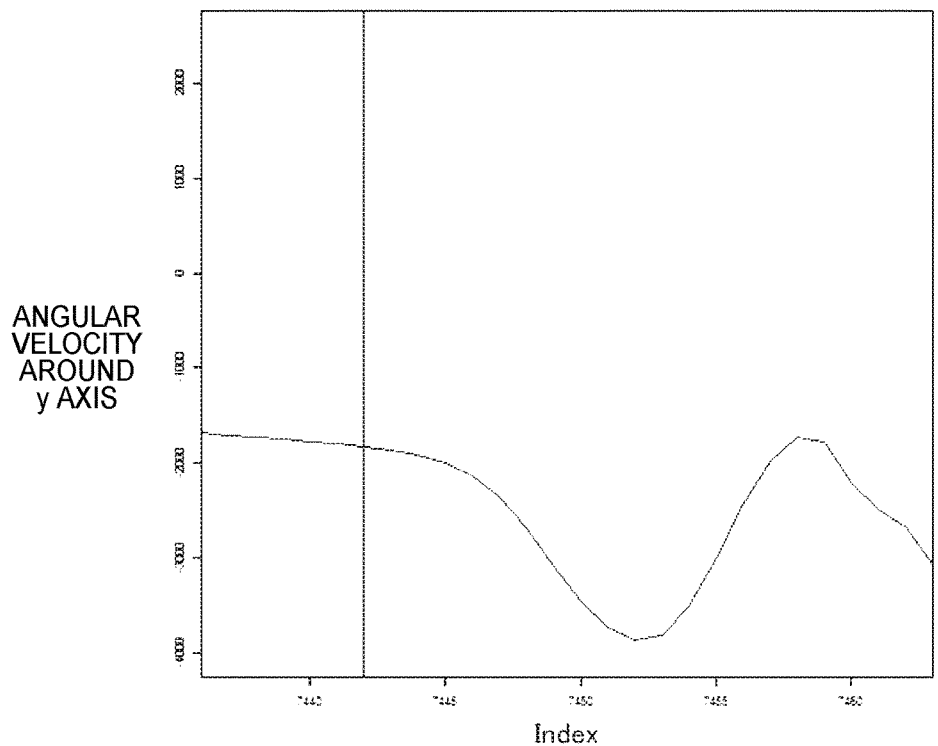
FIG. 17 is a graph illustrating a temporal change of angular velocity around a y axis before and after impact in the second swing.

FIG. 17 is a graph illustrating a temporal change of an angular velocity around the y axis before and after impact in the second swing. A longitudinal axis in FIG. 17 expresses an angular velocity around the y axis, and a transverse axis in FIG. 17 expresses a sampling number (Index) of items of data arranged in a time series. A single sampling number corresponds to a sampling interval [1/2000 Hz].

Figure 18:
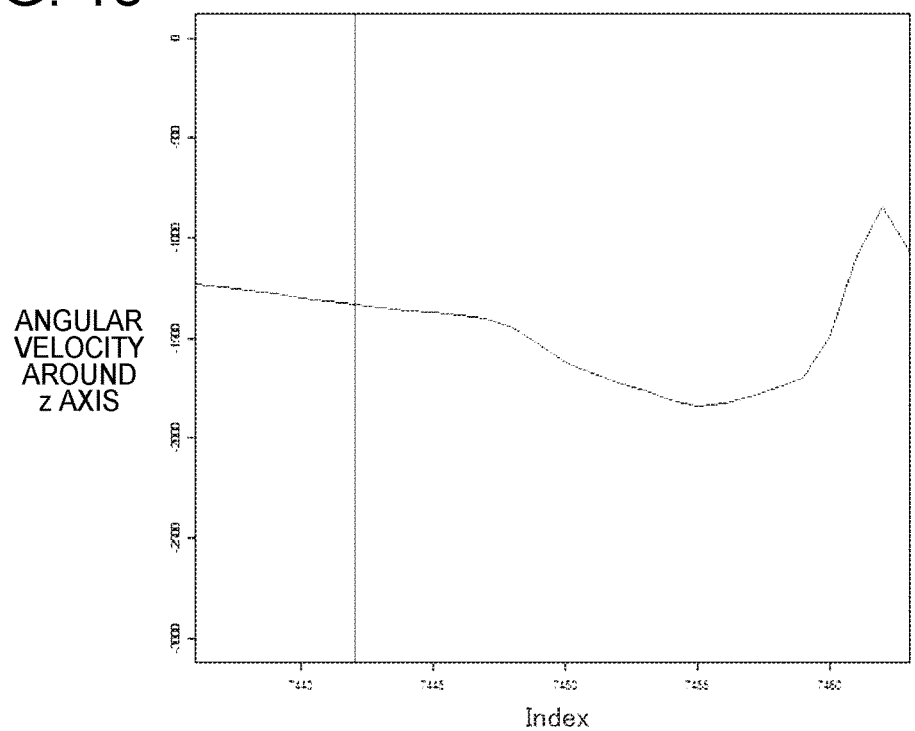
FIG. 18 is a graph illustrating a temporal change of angular velocity around a z axis before and after impact in the second swing.

FIG. 18 is a graph illustrating a temporal change of an angular velocity around the z axis before and after impact in the second swing. A longitudinal axis in FIG. 18 expresses an angular velocity around the z axis, and a transverse axis in FIG. 18 expresses a sampling number (Index) of items of data arranged in a time series. A single sampling number corresponds to a sampling interval [1/2000 Hz].

Figure 19:
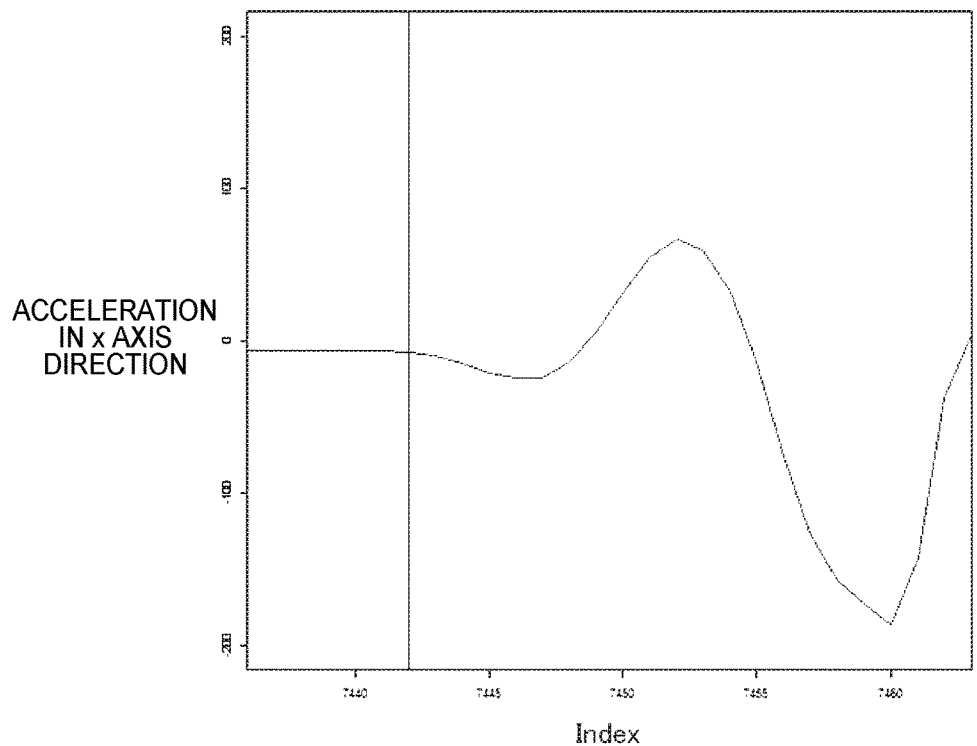
FIG. 19 is a graph illustrating a temporal change of acceleration in an x axis direction before and after impact in the second swing.

FIG. 19 is a graph illustrating a temporal change of an acceleration in the x axis direction before and after impact in the second swing. A longitudinal axis in FIG. 19 expresses an acceleration in the x axis direction, and a transverse axis in FIG. 19 expresses a sampling number (Index) of items of data arranged in a time series. A single sampling number corresponds to a sampling interval [1/2000 Hz].

Figure 20:
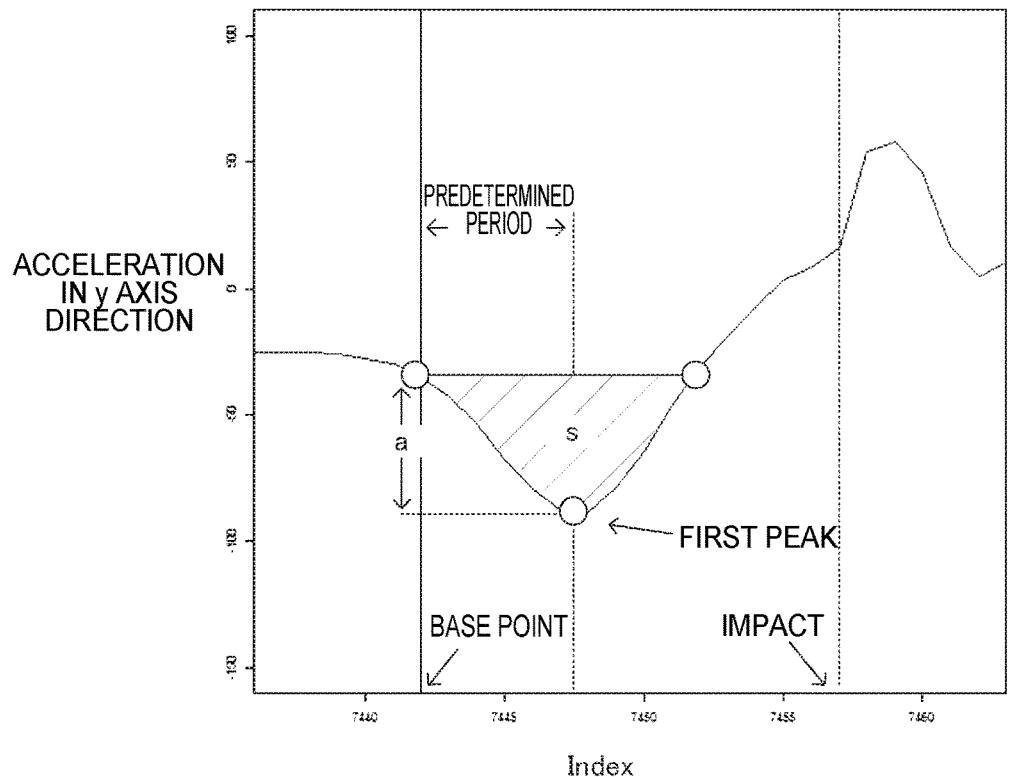
FIG. 20 is a graph illustrating a temporal change of acceleration in a y axis direction before and after impact in the second swing.

FIG. 20 is a graph illustrating a temporal change of an acceleration in the y axis direction before and after impact in the second swing. A longitudinal axis in FIG. 20 expresses an acceleration in the y axis direction, and a transverse axis in FIG. 20 expresses a sampling number (Index) of items of data arranged in a time series. A single sampling number corresponds to a sampling interval [1/2000 Hz].

The processing section 21 as a detection section of the motion analysis device 20 detects a timing (base point) used as a reference on the basis of measured data during a swing, extracts measured data after the base point from the measured data, and performs a process such as duff determination on the basis of the extracted measured data. A method of detecting a base point will be described later.

1-8-3. Duff Determination

The processing section 21 as a detection section of the motion analysis device 20 refers to a temporal change curve (FIGS. 15 and 20) of the acceleration in the y axis direction after the base point so as to determine whether a peak initially occurring in the curve after the base point is a negative peak or a positive peak. The processing section 21 determines that duff has occurred in the swing in a case where the initial peak is the negative peak, and determines that duff has not occurred in the swing in a case where the initial peak is the positive peak. In order to determine positive and negative of a peak, it may be easily determined whether or not the acceleration after the base point decreases toward the negative side.

First, the processing section 21 calculates an acceleration decrease amount with an acceleration value at the base point as a reference with respect to each of a predetermined number (for example, four) of sampling points after the base point among items of acceleration data in the y axis direction, and calculates a sum of the decrease amounts as a feature amount AY. The processing section 21 determines whether or not the feature amount AY exceeds a predetermined threshold value th (for example, the threshold value th is set to zero). The processing section 21 determines that duff has occurred in a case where the feature amount AY exceeds the predetermined threshold value th, and determines that duff has not occurred in a case where the feature amount AY does not exceed the predetermined threshold value th.

Here, the first swing (FIGS. 11 to 15) is a swing accompanied by duff, and thus an initial peak after the base point in the temporal change curve illustrated in FIG. 15 is a negative peak. In this case, the feature amount AY is positive, and it is determined that duff has occurred in the first swing.

Here, the second swing (FIGS. 16 to 20) is also a swing accompanied by duff, and thus an initial peak after the base point in the temporal change curve illustrated in FIG. 20 is a negative peak. In this case, the feature amount AY is positive, and it is determined that duff has occurred in the second swing.

Here, the occurrence of duff is determined on the basis of the temporal change curve of the acceleration in the y axis direction, but, similarly, the occurrence of duff may be determined on the basis of the temporal change curve of the angular velocity around the z axis, and, similarly, the occurrence of duff may be determined on the basis of the temporal change curve of the acceleration in the x axis direction. However, the reliability of each determination may differ (refer to reliability which will be described later).

1-8-4. Impact Determination

In the motion analysis device 20, the processing section 21 as a detection section further detects a timing of collision (impact) of the golf club 3 with the golf ball 4 by using outputs from the sensor unit 10. Therefore, the motion analysis device 20 enables the user 2 to easily compare a duff timing with an impact timing. Measured data which is considerably deviated from the impact timing can be excluded as data having no relation to duff. In other words, if an impact timing is known, measured data related to duff can be efficiently extracted.

For example, the processing section 21 of the motion analysis device 20 refers to the temporal change curve of the acceleration in the y axis direction after the base point so as to determine a timing (for example, a timing at which the curve rapidly increases exceeding a predetermined threshold value) at which a positive peak initially starts to occur in the curve after the base point, as the impact timing (refer to a dotted part in FIGS. 15 and 20). However, the processing section 21 as a detection section may detect an impact timing according to the above-described separate method (FIGS. 8 to 10). In the method (FIGS. 8 to 10), a norm of the angular velocities is used, but a norm of accelerations may be used instead of the norm of the angular velocities.

1-8-5. Computation of Reliability of Duff Determination

The processing section 21 of the motion analysis device 20 may compute the reliability of duff determination, for example, as follows.

The processing section 21 of the motion analysis device 20 refers to the temporal change curve of the acceleration in the y axis direction, calculates a displacement a in a predetermined period (for example, after 8.0 milliseconds) after the base point of the acceleration value in the y axis direction, and calculates reliability Ray of duff determination based on the acceleration in the y axis direction according to an equation of Ray=(|a|+70)/200. However, if Ray>1, Ray is assumed to be replaced with "1". A length of the predetermined period for computing the reliability may be set to, for example, a length from the base point in the temporal change curve of the acceleration in the y axis direction to a first peak after the base point (refer to FIG. 20), and may be set to a fixed value set in advance.

The processing section 21 of the motion analysis device 20 refers to the temporal change curve of the acceleration in the x axis direction, calculates a displacement a in a predetermined period (for example, after 8.0 milliseconds) after the base point of the acceleration value in the x axis direction, and calculates reliability Rax of duff determination based on the acceleration in the x axis direction according to an equation of Rax=(|a|+70)/200. However, if Rax>1, Rax is assumed to be replaced with "1".

The processing section 21 of the motion analysis device 20 refers to the temporal change curve of the angular velocity around the z axis, calculates a displacement a in a predetermined period (for example, after 8.0 milliseconds) after the base point of the angular velocity value around the z axis, and calculates reliability Raz of duff determination based on the angular velocity around the z axis according to an equation of Raz=(|a|+70)/200. However, if Raz>1, Raz is assumed to be replaced with "1".

The processing section 21 of the motion analysis device 20 performs weighted averaging on the respective reliabilities Rax, Ray and Raz calculated in the above-described way, so as to calculate comprehensive reliability. As an equation for weighted averaging, for example, an equation of (Ray×0.8+Rax×0.1+Raz×0.1) may be used.

A balance among the weights "0.8", "0.1", and "0.1" in the weight averaging may be changed as appropriate by any one of a manufacturer of the motion analysis device 20, the user 2, and the processing section 21, and may be fixed to a balance set in advance.

1-8-6. Detection of Base Point

The processing section 21 of the motion analysis device 20 detects a base point by specifying rising of the temporal change curve of the acceleration in each axis. Herein, a description will be made of an example using the acceleration in the y axis direction.

For example, the processing section 21 of the motion analysis device 20 calculates a difference (displacement) of the acceleration in the y axis direction included in the measured data for each sampling point. A reference of a difference (displacement) at each sampling point is, for example, a dotted line which is parallel to the transverse axis in FIG. 15, and is an acceleration value in the y axis direction at address or an acceleration average value in the y axis direction at address.

For example, as illustrated in FIG. 15, the processing section 21 of the motion analysis device 20 defines a sampling point (timing) at which an absolute value of the difference (displacement) is the maximum, as an approximate peak position MaxIndex of the first peak. The processing section 21 calculates a difference (displacement) at the approximate peak position MaxIndex as a peak difference MaxVal The processing section 21 sequentially refers to a predetermined number of (for example, 100 samples) previous differences (displacements) of the approximate peak position MaxIndex, and detects, as a base point BaseIndex, a sampling point (timing) at which the difference (displacement) initially matches (MaxVal×th). Here, it is assumed that order of the processing section 21 referring to the difference is an order in which the time is traced back (the order from the right side to the left side in FIG. 15). The coefficient th multiplied by the peak difference MaxVal by the processing section 21 is set to, for example, "0.2". However, the coefficient th may be a value which can be adjusted as appropriate.

1-8-7. Calculation of Duff Amount

In the motion analysis device 20, the processing section 21 as a detection section calculates a duff amount (an example of a collision amount) of the golf club 3 by using outputs from the sensor unit 10. Therefore, in a case where duff has occurred, the motion analysis device 20 enables the user 2 to objectively understand the duff amount. The "duff amount" mentioned here includes at least one of a duff intensity, a duff time, and a duff distance. However, hereinafter, a description will be made of a case where an amount obtained by integrating a collision intensity and a collision time is detected as a duff amount. The duff amount is reflected in the magnitude (a thickness and a height of a peak) of an initial peak (negative peak) after a base point in a temporal change curve of an acceleration in the y axis direction.

In the motion analysis device 20, the processing section 21 as a detection section uses an output value of the sensor unit 10 at a timing (here, a base point) at which duff is detected as a reference value, and calculates a duff amount on the basis of an output value of the sensor unit 10 in a period in which an output value of the sensor unit 10 becomes the reference value again from the timing. Therefore, the motion analysis device 20 can accurately calculate a duff amount on the basis of output values of the sensor unit 10 from the start of duff to the end thereof.

Specifically, the processing section 21 of the motion analysis device 20 refers to the temporal change curve of the acceleration in the y axis direction, and calculates an area s of a first peak (negative peak) right after the base point as a duff amount as indicated by a portion with diagonal lines in FIG. 20. The area s is calculated by adding differences at respective sampling points in a period from the base point to a timing at which the same acceleration value as at the base point appears again after the base point. The "differences at the sampling points" mentioned here are absolute values of values obtained by subtracting an acceleration value at the base point from acceleration values at the sampling points.

1-8-8. Correction using Type of Golf Club

The processing section 21 of the motion analysis device 20 may correct the above-described detection results (for example, the duff amount) depending on the type of golf club 3.

For example, the type of golf club 3 used for a swing by the user 2 is stored in the storage section 24 as the club specification information, and thus the processing section 21 can specify the type of golf club 3 by referring to the club specification information. Thus, the processing section 21 of the motion analysis device 20 calculates the duff amount, and then corrects the duff amount according to the type (club number) of golf club 3. For example, as the shaft of the golf club 3 is lengthened, the processing section 21 corrects the calculated duff amount to become smaller.

The processing section 21 of the motion analysis device 20 may change a correction amount of the duff amount according to a shape (the lie angle illustrated in FIG. 6, the loft angle illustrated in FIG. 7, or the like) of the ball hitting portion (head) 3b of the golf club 3.

1-8-9. Correction using Head Speed

In the motion analysis device 20, the processing section 21 as a detection section may use a value obtained by dividing an output value of the sensor unit 10 by a speed (head speed) of the ball hitting portion (head) 3b of the golf club 3, for calculation of a duff amount. The head speed used for calculation is a head speed, for example, at a timing at which duff occurred. Therefore, the motion analysis device 20 can accurately calculate a duff amount regardless of the magnitude of a head speed. The same effect can be achieved by adjusting a reference of detection according to a head speed instead of dividing an output value by a head speed. The processing section 21 of the motion analysis device 20 may correct the detection results (for example, the duff amount) according to a head speed of the golf club 3.

1-8-10. Use of Related Information

The processing section 21 as a detection section of the motion analysis device 20 may calculate an actual duff amount on the basis of a known relationship established between an output (at least one of an acceleration output and an angular velocity output) from the sensor unit 10 and a duff amount. This relationship is a relationship based on statistical data acquired from swings of various users 2, and is stored in the storage section 24 in various forms such as a table and a computation formula. The processing section 21 may calculate a duff amount on the basis of the relationship. Therefore, the motion analysis device 20 can accurately calculate a duff amount on the basis of the known relationship (a table or a computation formula obtained on the basis of the statistical data). It is possible to reduce a calculation load required for calculation on the basis of the known relationship.

1-9. Flowchart 1-9-1. Overall Flow

Figure 21:
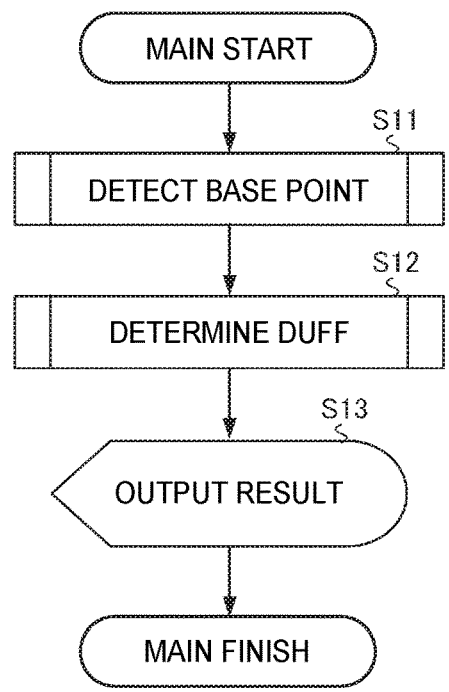
FIG. 21 is a flowchart illustrating a principal process in the motion analysis device.

FIG. 21 is a flowchart illustrating an example of an operation of the motion analysis device 20.

The processing section 21 of the motion analysis device 20 performs a process in the flowchart illustrated in FIG. 21, for example, in a case where the user 2 performs a swing with the golf club 3. It is assumed that measured data related to the swing is accumulated in the storage section 24 at the time of starting the flowchart.

First, the processing section 21 performs a process (S11) for detecting a base point.

Next, the processing section 21 performs a duff process (S12) related to detection or the like of the occurrence of duff.

Next, the processing section 21 outputs a result of the process, that is, a result of the duff process to the user 2 (S13). The output of the result is performed by, for example, display of an image (the image includes a text image, a pattern, a mark, an icon, blinking of light, and the like) on the display section 25, and output of a sound (the sound includes a voice, an alarm sound, a buzzer sound, vibration, and the like) from the sound output section 26.

Here, the processing section 21 in step S13 outputs a determination result of the occurrence of duff, a determination result of impact, a calculation result of a duff amount, the reliability of a duff determination, the reliability of an impact determination, and the like to the user 2.

For example, in a case where all of a duff determination result based on the acceleration in the y axis direction, a duff determination result based on the acceleration in the x axis direction, and a duff determination result based on the angular velocity around the z axis show the "occurrence of duff", the processing section 21 outputs a result such as the "occurrence of duff" as a comprehensive determination result along with comprehensive reliability (reliability having undergone weighted averaging). In a case where the reliability is "1", a probability of the occurrence of duff is 100%, and, in a case where the reliability is less than "1", a probability of the occurrence of duff is lower than 100%.

On the other hand, in a case where all of a duff determination result based on the acceleration in the y axis direction, a duff determination result based on the acceleration in the x axis direction, and a duff determination result based on the angular velocity around the z axis show the "non-occurrence of duff", the processing section 21 outputs a result such as the "non-occurrence of duff" as a comprehensive determination result along with comprehensive reliability (reliability having undergone weighted averaging). In a case where the reliability is "1", a probability of the non-occurrence of duff is 100%, and, in a case where the reliability is less than "1", a probability of the non-occurrence of duff is lower than 100%.

1-9-2. Base Point Detection Flow

Figure 22:
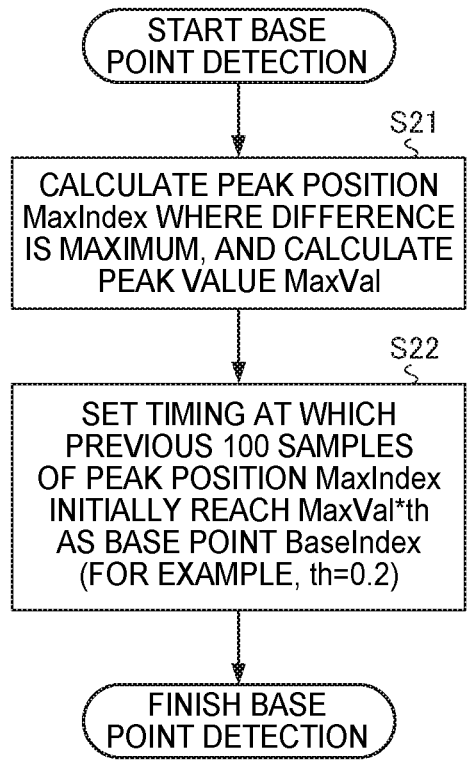
FIG. 22 is a flowchart illustrating a base point detection process in the motion analysis device.

FIG. 22 illustrates a flow in the base point detection process (S11) in FIG. 21.

First, the processing section 21 of the motion analysis device 20 calculates a difference (displacement) of the acceleration in the y axis direction included in the measured data for each sampling point, defines a sampling point (timing) at which an absolute value of the difference is the maximum as a peak position MaxIndex, and calculates a difference (displacement) at the peak position MaxIndex as a peak difference MaxVal (S21).

Next, the processing section 21 refers to differences of the previous 100 samples of the peak position MaxIndex, and detects a sampling point (timing) at which a difference initially reaches a value corresponding to 0.2 times the peak value MaxVal as a base point BaseIndex (S22).

1-9-3. Flow of Duff Process

Figure 23:
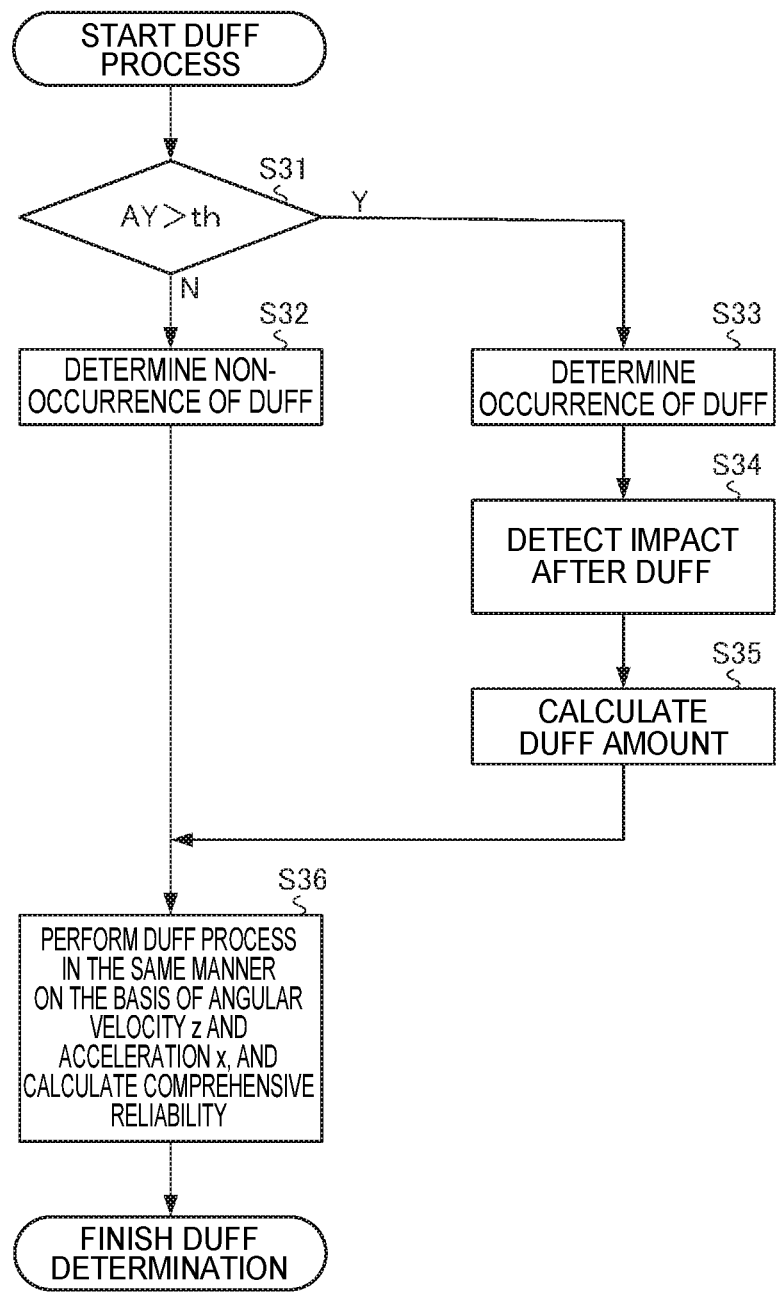
FIG. 23 is a flowchart illustrating a duff determination process in the motion analysis device.

FIG. 23 illustrates a flow of the duff process (S12) in FIG. 21 (an example of a detection process).

First, the processing section 21 of the motion analysis device 20 calculates a feature amount AY on the basis of four sampling points after the base point, and determines whether or not the feature amount AY exceeds a predetermined threshold value th (for example, th is zero) (S31).

The processing section 21 determines that duff has occurred (S33) in a case where the feature amount AY exceeds the threshold value th (S31Y), and determines that duff has not occurred (S32) if otherwise (S31N). In a case where it is determined that duff has not occurred (S32), the processing section 21 proceeds to a reliability calculation process (S36).

In a case where it is determined that duff has occurred (S33), the processing section 21 performs a process of detecting impact (S34), performs a duff amount calculation process (S35), and then proceeds to the reliability calculation process (S36).

Next, the processing section 21 performs a duff determination based on the angular velocity around the z axis and a duff determination based on the acceleration in the x axis direction so as to acquire three determination results. The processing section 21 performs weighted averaging on the reliabilities Ray, Rax and Raz so as to calculate comprehensive reliability. The processing section 21 acquires a comprehensive determination result on the basis of the three determination results (S36).

1-10. Advantageous Effects

The motion analysis device 20 of the present embodiment analyzes a swing using the golf club 3, and includes the processing section 21. The processing section 21 operates as an acquisition section acquiring outputs from the sensor unit 10 as appropriate, and operates as a detection section detecting duff of the golf club 3 by using at least an acceleration output among the outputs from the sensor unit 10.

Therefore, the user 2 can objectively understand whether or not duff has occurred during a swing. A criterion (a threshold value or the like) of detection is appropriately set, and thus it is possible to prevent wrongly detecting simple contact with turfs or sands on the ground as duff. Conversely, collision with the ground, turfs, and sands may also be detected as collision.

2. MODIFICATION EXAMPLES

2-1. Variation of Golf Club

In the embodiments, the golf club 3 as an exercise apparatus may be any of a driver, an iron, and a putter. The system of the present embodiment may be effective in a case of at least the iron in which an occurrence frequency of duff is high.

2-2. Variation of Exercise Apparatus

In the embodiments, the motion analysis system 1 analyzing a golf swing has been described as an example, but the invention is applicable to other exercise apparatuses used to hit a ball placed on the ground, such as a hockey stick.

2-3. Variation of Function Sharing

The respective embodiments may be combined with each other. Some requirements of the embodiments may be omitted. The above-described functional configurations of the motion analysis system 1 are classified according to the principal process content for better understanding of the configuration of the motion analysis system 1. The invention is not limited due to a method or a name of classification of a constituent element. A configuration of the motion analysis system 1 may be classified into more constituent elements depending on the process content. A single constituent element may be classified to perform more processes. A process in each constituent element may be performed by a single item of hardware, and may be performed by a plurality of items of hardware.

2-4. Variation of Flow

The respective processing units in the above-described flowcharts are classified according to the principal process content for better understanding of the processes of the motion analysis system 1. The invention is not limited due to a method or a name of division of the processing unit. A process in the motion analysis system 1 may be divided into more processing units depending on the process content. A single processing unit may be divided to include more processes. The order of processing is not limited to the flowcharts.

2-5. Others

As mentioned above, the invention has been described by using the embodiments, but the technical scope of the invention is not limited to the scope disclosed in the embodiments. It is clear to a person skilled in the art that various modifications or alterations are added to the embodiments. It is also clear from the disclosure of the scope of the appended claims that forms in which various modifications or alterations are added to the embodiments are included in the technical scope of the invention. The invention may be provided as a motion analysis method, a program, and a storage medium storing the program. In the embodiments, the sensor unit 10 and the motion analysis device 20 have been described as being separate from each other, but the function of the motion analysis device 20 may be installed in the sensor unit 10. Sharing of the function may be changed as appropriate (this is also the same for the function of the server 30).

What is claimed is:

1. A motion analysis device for determining a presence or non-presence of duff in a swing performed by a user using an exercise apparatus, the motion analysis device comprising:
   an inertial sensor connected to the exercise apparatus, the inertial sensor being configured to measure an acceleration of the exercise apparatus during the swing performed by the user; and
   a processor programmed to:
      obtain an acceleration of the exercise apparatus from the inertial sensor for at least one swing,
      calculate a temporal change curve of the at least one swing based on the obtained acceleration,
      calculate a duff amount by integrating a collision intensity and a collision time of the temporal change curve,
      determine that duff is present in the at least one swing when the calculated duff amount is equal or greater than a predetermined threshold, and
      determine a non-presence of duff in the at least one swing when the initial peak of the temporal change curve is positive.

2. The motion analysis device according to claim 1, wherein the acceleration output from the inertial sensor includes data regarding acceleration generated in a long axis direction of a shaft of the exercise apparatus.

3. The motion analysis device according to claim 1, wherein the processor is further programmed to:
   obtain an angular velocity of the exercise apparatus from the inertial sensor for at least one swing, and
   calculate the temporal change curve of the at least one swing based on the obtained acceleration and the obtained angular velocity.

4. The motion analysis device according to claim 1, wherein the processor calculates a duff amount of the exercise apparatus with the ground.

5. The motion analysis device according to claim 4, wherein the processor is further programmed to:
   calculate a first output value of the inertial sensor at a first timing at which the duff is detected as a reference value, and
   calculate the duff amount based on the first output value in a period from the first timing to a second timing at which a second output value of the inertial sensor becomes the reference value again.

6. The motion analysis device according to claim 5, wherein the processor determines the duff amount based on a value obtained by dividing an output value of the inertial sensor by a speed of a ball hitting portion of the exercise apparatus.

7. The motion analysis device according to claim 4, wherein the processor determines the duff amount based on a value obtained by dividing an output value of the inertial sensor by a speed of a ball hitting portion of the exercise apparatus.

8. The motion analysis device according to claim 4, wherein the processor calculates the duff amount with the ground based on a known relationship established between outputs from the inertial sensor and an initially calculated duff amount of the exercise apparatus with the ground.

9. The motion analysis device according to claim 1, wherein the processor is further programmed to:
   detect a timing at which the exercise apparatus collides with an object to be hit based on outputs from the inertial sensor.

10. The motion analysis device according to claim 1, wherein
   the integration of the collision intensity and the collision time of the temporal change curve includes:
      determining a first base point and a second base point of a negative peak in the temporal change curve, and calculating an area of the negative peak of the temporal change curve from the first base point to the second base point.

11. A motion analysis method for determining a presence or non-presence of duff in at least one swing performed by a user using an exercise apparatus, the motion analysis method comprising:
  measuring, by an inertial sensor connected to the exercise apparatus, an acceleration of the exercise apparatus during the at least one swing performed by the user;
  obtaining an acceleration of the exercise apparatus from the inertial sensor for the at least one swing;
  calculating a temporal change curve of the at least one swing based on the obtained acceleration;
  calculating a duff amount by integrating a collision intensity and a collision time of the temporal change curve;
  determining that duff is present in the at least one swing when the calculated duff amount is equal or greater than a predetermined threshold;
  determining a non-presence of duff in the at least one swing when the initial peak of the temporal change curve is positive; and
  outputting whether the presence or the non-presence of duff has occurred.

12. The motion analysis method according to claim 11, wherein
  the integration of the collision intensity and the collision time of the temporal change curve includes:
    determining a first base point and a second base point of a negative peak in the temporal change curve, and
    calculating an area of the negative peak of the temporal change curve from the first base point to the second base point.

13. A non-transitory computer readable medium storing instructions for determining a presence or non-presence of duff in a swing performed by a user using an exercise apparatus that is connected to an inertial sensor, the instructions causing a processor to execute steps comprising:
  measuring, by the inertial sensor, an acceleration of the exercise apparatus during the at least one swing performed by the user;
  obtaining, by the processor, an acceleration of the exercise apparatus from the inertial sensor for the at least one swing;
  calculating, by the processor, a temporal change curve of the at least one swing based on the obtained acceleration;
  calculating, by the processor, a duff amount by integrating a collision intensity and a collision time of the temporal change curve;
  determining, by the processor, that duff is present in the at least one swing when the calculated duff amount is equal or greater than a predetermined threshold;
  determining, by the processor, a non-presence of duff in the at least one swing when the initial peak of the temporal change curve is positive; and
  outputting, by the processor, whether the presence or non-presence of duff has occurred.

14. The non-transitory computer readable medium according to claim 13, wherein
  the integration of the collision intensity and the collision time of the temporal change curve includes:
    determining a first base point and a second base point of a negative peak in the temporal change curve, and
    calculating an area of the negative peak of the temporal change curve from the first base point to the second base point.

15. A motion analysis system for determining a presence or non-presence of duff in a swing performed by a user using an exercise apparatus, the motion analysis system comprising:
  an inertial sensor connected to the exercise apparatus, the inertial sensor being configured to measure an acceleration of the exercise apparatus during the swing performed by the user; and
  a processor programmed to:
    obtain an acceleration of the exercise apparatus from the inertial sensor for at least one swing,
    calculate a temporal change curve of the at least one swing based on the obtained acceleration,
    calculate a duff amount by integrating a collision intensity and a collision time of the temporal change curve,
    determine that duff is present in the at least one swing when the calculated duff amount is equal or greater than a predetermined threshold, and
    determine a non-presence of duff in the at least one swing when the initial peak of the temporal change curve is positive.

16. The motion analysis device according to claim 15, wherein
  the integration of the collision intensity and the collision time of the temporal change curve includes:
    determining a first base point and a second base point of a negative peak in the temporal change curve, and
    calculating an area of the negative peak of the temporal change curve from the first base point to the second base point.

* * * * *